United States Patent
Maheshwari

(10) Patent No.: US 6,927,891 B1
(45) Date of Patent: Aug. 9, 2005

(54) TILT-ABLE GRATING PLANE FOR IMPROVED CROSSTALK IN 1×N BLAZE SWITCHES

(75) Inventor: Dinesh Maheshwari, Fremont, CA (US)

(73) Assignee: Silicon Light Machines Corporation, Sunnyvale, CA (US)

(*) Notice: Subject to any disclaimer, the term of this patent is extended or adjusted under 35 U.S.C. 154(b) by 212 days.

(21) Appl. No.: 10/327,762

(22) Filed: Dec. 23, 2002

(51) Int. Cl.[7] .................. G02B 26/00; G02B 26/08; G02B 5/18; G02F 1/29
(52) U.S. Cl. .................. 359/291; 359/298; 359/224; 359/572
(58) Field of Search .................. 359/224, 290, 359/291, 295, 298, 318, 572, 573

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai .................. 178/5.4 |
| 2,783,406 A | 2/1957 | Vanderhooft .................. 313/70 |
| 2,920,529 A | 1/1960 | Blythe .................. 88/73 |
| 2,991,690 A | 7/1961 | Grey et al. .................. 88/16.6 |
| RE25,169 E | 5/1962 | Glenn |
| 3,256,465 A | 6/1966 | Weissenstern et al. .................. 317/101 |

(Continued)

FOREIGN PATENT DOCUMENTS

| | | | |
|---|---|---|---|
| DE | 197 51 716 A1 | 5/1998 | .......... G02B/27/14 |
| EP | 0 261 901 A2 | 3/1988 | .......... G09G/3/36 |
| EP | 0 314 437 A1 | 10/1988 | .......... H01L/25/08 |
| EP | 0 304 263 A2 | 2/1989 | ........ H01L/25/065 |
| EP | 0 306 308 A2 | 3/1989 | .......... H04N/3/14 |
| EP | 0 322 714 A2 | 7/1989 | .......... G02B/5/30 |
| EP | 0 627 644 A3 | 9/1990 | .......... G02B/27/00 |
| EP | 0 436 738 A1 | 7/1991 | .......... H04N/5/74 |
| EP | 0 458 316 A2 | 11/1991 | .......... G06K/11/06 |
| EP | 0 477 566 A2 | 4/1992 | .......... G02B/26/08 |

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

(Continued)

Primary Examiner—Georgia Epps
Assistant Examiner—William Choi
(74) Attorney, Agent, or Firm—Okamoto & Benedicto LLP

(57) ABSTRACT

A light modulator includes elongated elements arranged parallel to each other. Each elongated element includes a light reflective planar surface with the light reflective planar surfaces configured in a first grating plane. A support structure is coupled to the elongated elements to maintain a position of the elongated elements relative to each other and to enable movement of each elongated element in a direction normal to the first grating plane. The support structure enables movement between a first modulator configuration and a second modulator configuration. In the first modulator configuration, the elongated elements act to reflect an incident light as a plane mirror. In the second modulator configuration, the elongated elements form a stepped blaze configuration along a second grating plane lying at a grating angle to the first grating plane and act to diffract the incident light into at least two diffraction orders.

20 Claims, 11 Drawing Sheets

U.S. PATENT DOCUMENTS

| | | | |
|---|---|---|---|
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Emstoff et al. | 178/5.4 BD |
| 3,783,184 A | 1/1974 | Emstoff et al. | 178/5.4 BD |
| 3,792,916 A | 2/1974 | Sama | 350/163 |
| 3,802,769 A | 4/1974 | Rotz et al. | 352/43 |
| 3,811,186 A | 5/1974 | Lamerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | 257/713 |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe | 358/241 |

| | | | | | | |
|---|---|---|---|---|---|---|
| 4,652,932 A | 3/1987 | Miyajima et al. ............ 358/236 | | 4,970,575 A | 11/1990 | Soga et al. .................... 357/72 |
| 4,655,539 A | 4/1987 | Caulfield et al. ............. 350/3.6 | | 4,978,202 A | 12/1990 | Yang ....................... 350/331 R |
| 4,660,938 A | 4/1987 | Kazan ......................... 350/355 | | 4,982,184 A | 1/1991 | Kirkwood .................... 340/783 |
| 4,661,828 A | 4/1987 | Miller, Jr. et al. .......... 346/108 | | 4,982,265 A | 1/1991 | Watanabe et al. .............. 357/75 |
| 4,662,746 A | 5/1987 | Hornbeck .................... 350/269 | | 4,984,824 A | 1/1991 | Antes et al. ................... 283/91 |
| 4,663,670 A | 5/1987 | Ito et al. ...................... 358/245 | | 4,999,308 A | 3/1991 | Nishiura et al. ................ 437/4 |
| 4,687,326 A | 8/1987 | Corby, Jr. ....................... 356/5 | | 5,003,300 A | 3/1991 | Wells ......................... 340/705 |
| 4,698,602 A | 10/1987 | Armitage ................... 332/7.51 | | 5,009,473 A | 4/1991 | Hunter et al. ................. 350/6.6 |
| 4,700,276 A | 10/1987 | Freyman et al. ............. 361/403 | | 5,013,141 A | 5/1991 | Sakata ........................ 350/348 |
| 4,707,064 A | 11/1987 | Dobrowolski et al. ... 350/96.19 | | 5,018,256 A | 5/1991 | Hornbeck ................. 29/25.01 |
| 4,709,995 A | 12/1987 | Kuribayashi et al. ........ 350/350 | | 5,022,750 A | 6/1991 | Flasck .......................... 353/31 |
| 4,710,732 A | 12/1987 | Hornbeck .................. 332/7.51 | | 5,023,905 A | 6/1991 | Wells et al. ................... 379/96 |
| 4,711,526 A | 12/1987 | Hennings et al. ............ 350/170 | | 5,024,494 A | 6/1991 | Williams et al. .............. 350/3.6 |
| 4,714,326 A | 12/1987 | Usui et al. ................... 350/485 | | 5,028,939 A | 7/1991 | Hornbeck et al. ........... 346/160 |
| 4,717,066 A | 1/1988 | Goldenberg et al. ........ 228/179 | | 5,031,144 A | 7/1991 | Persky ........................ 365/145 |
| 4,719,507 A | 1/1988 | Bos ............................... 358/92 | | 5,035,473 A | 7/1991 | Kuwayama et al. .......... 350/3.7 |
| 4,721,629 A | 1/1988 | Sakai et al. .................... 427/35 | | 5,037,173 A | 8/1991 | Sampsell et al. .............. 385/17 |
| 4,722,593 A | 2/1988 | Shimazaki ................... 350/336 | | 5,039,628 A | 8/1991 | Carey .......................... 437/183 |
| 4,724,467 A | 2/1988 | Yip et al. ....................... 355/71 | | 5,040,052 A | 8/1991 | McDavid ...................... 357/80 |
| 4,728,185 A | 3/1988 | Thomas ....................... 353/122 | | 5,041,395 A | 8/1991 | Steffen ........................ 437/206 |
| 4,743,091 A | 5/1988 | Gelbart ........................ 350/252 | | 5,041,851 A | 8/1991 | Nelson ........................ 346/160 |
| 4,744,633 A | 5/1988 | Sheiman ...................... 350/132 | | 5,043,917 A | 8/1991 | Okamoto .................... 364/518 |
| 4,747,671 A | 5/1988 | Takahashi et al. ........... 350/336 | | 5,048,077 A | 9/1991 | Wells et al. ................... 379/96 |
| 4,751,509 A | 6/1988 | Kubota et al. ............... 340/784 | | 5,049,901 A | 9/1991 | Gelbart ....................... 346/108 |
| 4,761,253 A | 8/1988 | Antes ............................ 264/1.3 | | 5,058,992 A | 10/1991 | Takahashi ................... 359/567 |
| 4,763,975 A | 8/1988 | Scifres et al. ............. 350/96.15 | | 5,060,058 A | 10/1991 | Goldenberg et al. .......... 358/60 |
| 4,765,865 A | 8/1988 | Gealer et al. ................. 156/647 | | 5,061,049 A | 10/1991 | Hornbeck .................... 359/224 |
| 4,772,094 A | 9/1988 | Sheiman ...................... 350/133 | | 5,066,614 A | 11/1991 | Dunaway et al. ............ 437/209 |
| 4,797,694 A | 1/1989 | Agostinelli et al. .......... 346/160 | | 5,068,205 A | 11/1991 | Baxter et al. ................ 437/205 |
| 4,797,918 A | 1/1989 | Lee et al. ...................... 380/20 | | 5,072,239 A | 12/1991 | Mitcham et al. ............ 346/108 |
| 4,801,194 A | 1/1989 | Agostinelli et al. .......... 350/356 | | 5,072,418 A | 12/1991 | Boutaud et al. ....... 364/715.06 |
| 4,803,560 A | 2/1989 | Matsunaga et al. .......... 359/236 | | 5,074,947 A | 12/1991 | Estes et al. ............... 156/307.3 |
| 4,804,641 A | 2/1989 | Arlt et al. ..................... 437/227 | | 5,075,940 A | 12/1991 | Kuriyama et al. .......... 29/25.03 |
| 4,807,021 A | 2/1989 | Okumura ....................... 357/75 | | 5,079,544 A | 1/1992 | DeMond et al. ............. 340/701 |
| 4,807,965 A | 2/1989 | Garakani ..................... 350/131 | | 5,081,617 A | 1/1992 | Gelbart ........................ 369/112 |
| 4,809,078 A | 2/1989 | Yabe et al. .................. 358/236 | | 5,083,857 A | 1/1992 | Hornbeck .................... 359/291 |
| 4,811,082 A | 3/1989 | Jacobs et al. .................. 357/80 | | 5,085,497 A | 2/1992 | Um et al. ..................... 359/848 |
| 4,811,210 A | 3/1989 | McAulay ..................... 364/200 | | 5,089,903 A | 2/1992 | Kuwayama et al. ........... 359/15 |
| 4,814,759 A | 3/1989 | Gombrich et al. ........... 340/771 | | 5,093,281 A | 3/1992 | Eshima ........................ 437/217 |
| 4,817,850 A | 4/1989 | Wiener-Avnear et al. ... 228/119 | | 5,096,279 A | 3/1992 | Hornbeck et al. ........... 359/230 |
| 4,824,200 A | 4/1989 | Isono et al. ............... 350/96.16 | | 5,099,353 A | 3/1992 | Hornbeck .................... 359/291 |
| 4,827,391 A | 5/1989 | Sills .............................. 363/41 | | 5,101,184 A | 3/1992 | Antes .......................... 235/454 |
| 4,829,365 A | 5/1989 | Eichenlaub ..................... 358/3 | | 5,101,236 A | 3/1992 | Nelson et al. ............... 355/229 |
| 4,836,649 A | 6/1989 | Ledebuhr et al. ........ 350/331 R | | 5,103,334 A | 4/1992 | Swanberg .................... 359/197 |
| 4,856,863 A | 8/1989 | Sampsell et al. .......... 350/96.16 | | 5,105,207 A | 4/1992 | Nelson ........................ 346/160 |
| 4,856,869 A | 8/1989 | Sakata et al. ........... 350/162.18 | | 5,105,299 A | 4/1992 | Anderson et al. ............ 359/223 |
| 4,859,012 A | 8/1989 | Cohn ...................... 350/98.24 | | 5,105,369 A | 4/1992 | Nelson ........................ 364/525 |
| 4,859,060 A | 8/1989 | Katagiri et al. .............. 356/352 | | 5,107,372 A | 4/1992 | Gelbart et al. ............... 359/824 |
| 4,866,488 A | 9/1989 | Frensley ........................ 357/4 | | 5,112,436 A | 5/1992 | Bol .............................. 156/643 |
| 4,882,683 A | 11/1989 | Rupp et al. .................. 364/521 | | 5,113,272 A | 5/1992 | Reamey ........................ 359/53 |
| 4,893,509 A | 1/1990 | MacIver et al. ........ 73/517 AV | | 5,113,285 A | 5/1992 | Franklin et al. ............. 359/465 |
| 4,896,325 A | 1/1990 | Coldren ........................ 372/20 | | 5,115,344 A | 5/1992 | Jaskie ......................... 359/573 |
| 4,896,948 A | 1/1990 | Dono et al. .................. 350/355 | | 5,119,204 A | 6/1992 | Hashimoto et al. .......... 358/254 |
| 4,897,708 A | 1/1990 | Clements ...................... 357/65 | | 5,121,343 A | 6/1992 | Faris ........................... 395/111 |
| 4,902,083 A | 2/1990 | Wells .......................... 350/6.6 | | 5,126,812 A | 6/1992 | Greiff ........................... 357/25 |
| 4,915,463 A | 4/1990 | Barbee, Jr. ................... 350/1.1 | | 5,126,826 A | 6/1992 | Kauchi et al. ................. 357/72 |
| 4,915,479 A | 4/1990 | Clarke ......................... 350/345 | | 5,126,836 A | 6/1992 | Um .............................. 358/60 |
| 4,924,413 A | 5/1990 | Suwannukul ................ 364/521 | | 5,128,660 A | 7/1992 | DeMond et al. ............. 340/707 |
| 4,926,241 A | 5/1990 | Carey ........................... 357/75 | | 5,129,716 A | 7/1992 | Holakovszky et al. ......... 351/50 |
| 4,930,043 A | 5/1990 | Wiegand ..................... 361/283 | | 5,132,723 A | 7/1992 | Gelbart ......................... 355/40 |
| 4,934,773 A | 6/1990 | Becker ........................ 350/6.6 | | 5,132,812 A | 7/1992 | Takahashi et al. .............. 359/9 |
| 4,940,309 A | 7/1990 | Baum ......................... 350/171 | | 5,136,695 A | 8/1992 | Goldshlag et al. ........... 395/275 |
| 4,943,815 A | 7/1990 | Aldrich et al. ............... 346/108 | | 5,137,836 A | 8/1992 | Lam ............................... 437/8 |
| 4,945,773 A | 8/1990 | Sickafus .................. 73/862.59 | | 5,142,303 A | 8/1992 | Nelson ........................ 346/108 |
| 4,949,148 A | 8/1990 | Bartelink ...................... 357/74 | | 5,142,405 A | 8/1992 | Hornbeck .................... 359/226 |
| 4,950,890 A | 8/1990 | Gelbart .................... 250/237 G | | 5,142,677 A | 8/1992 | Ehlig et al. .................. 395/650 |
| 4,952,925 A | 8/1990 | Haastert ...................... 340/784 | | 5,144,472 A | 9/1992 | Sang, Jr. et al. ............. 359/254 |
| 4,954,789 A | 9/1990 | Sampsell ...................... 330/4.3 | | 5,147,815 A | 9/1992 | Casto ........................... 437/51 |
| 4,956,619 A | 9/1990 | Hornbeck .................... 330/4.3 | | 5,148,157 A | 9/1992 | Florence ..................... 340/783 |
| 4,961,633 A | 10/1990 | Ibrahim et al. .............. 350/392 | | 5,148,506 A | 9/1992 | McDonald ................... 385/16 |
| 4,963,012 A | 10/1990 | Tracy et al. .................. 350/641 | | 5,149,405 A | 9/1992 | Bruns et al. ............. 204/129.13 |

| | | | | | |
|---|---|---|---|---|---|
| 5,150,205 A | 9/1992 | Um et al. ............... 358/60 | 5,239,448 A | 8/1993 | Perkins et al. ............ 361/764 |
| 5,151,718 A | 9/1992 | Nelson ............... 346/160 | 5,239,806 A | 8/1993 | Maslakow ............... 53/402 |
| 5,151,724 A | 9/1992 | Kikinis ............... 357/17 | 5,240,818 A | 8/1993 | Mignardi et al. ........... 430/321 |
| 5,151,763 A | 9/1992 | Marek et al. ............ 357/26 | 5,245,686 A | 9/1993 | Faris et al. ............... 385/120 |
| 5,153,770 A | 10/1992 | Harris ............... 359/245 | 5,247,180 A | 9/1993 | Mitcham et al. ............ 250/492.1 |
| 5,155,604 A | 10/1992 | Miekka et al. ............ 359/2 | 5,247,593 A | 9/1993 | Lin et al. ............... 385/17 |
| 5,155,615 A | 10/1992 | Tagawa ............... 359/213 | 5,249,245 A | 9/1993 | Lebby et al. ............ 385/89 |
| 5,155,778 A | 10/1992 | Magel et al. ............ 385/18 | 5,251,057 A | 10/1993 | Guerin et al. ............ 359/249 |
| 5,155,812 A | 10/1992 | Ehlig et al. ............ 395/275 | 5,251,058 A | 10/1993 | MacArthur ............ 359/249 |
| 5,157,304 A | 10/1992 | Kane et al. ............ 313/495 | 5,254,980 A | 10/1993 | Hendrix et al. ............ 345/84 |
| 5,159,485 A | 10/1992 | Nelson ............... 359/291 | 5,255,100 A | 10/1993 | Urbanus ............... 358/231 |
| 5,161,042 A | 11/1992 | Hamada ............... 359/41 | 5,256,869 A | 10/1993 | Lin et al. ............ 250/201.9 |
| 5,162,787 A | 11/1992 | Thompson et al. ............ 340/794 | 5,258,325 A | 11/1993 | Spitzer et al. ............ 437/86 |
| 5,164,019 A | 11/1992 | Sinton ............... 136/249 | 5,260,718 A | 11/1993 | Rommelmann et al. 346/107 R |
| 5,165,013 A | 11/1992 | Faris ............... 395/104 | 5,260,798 A | 11/1993 | Um et al. ............... 358/233 |
| 5,168,401 A | 12/1992 | Endriz ............... 359/625 | 5,262,000 A | 11/1993 | Welbourn et al. ............ 156/643 |
| 5,168,406 A | 12/1992 | Nelson ............... 359/855 | 5,272,473 A | 12/1993 | Thompson et al. ............ 345/7 |
| 5,170,156 A | 12/1992 | DeMond et al. ............ 340/794 | 5,278,652 A | 1/1994 | Urbanus et al. ............ 358/160 |
| 5,170,269 A | 12/1992 | Lin et al. ............... 359/9 | 5,278,925 A | 1/1994 | Boysel et al. ............ 385/14 |
| 5,170,283 A | 12/1992 | O'Brien et al. ............ 359/291 | 5,280,277 A | 1/1994 | Hornbeck ............ 345/108 |
| 5,172,161 A | 12/1992 | Nelson ............... 355/200 | 5,281,887 A | 1/1994 | Engle ............ 310/335 |
| 5,172,262 A | 12/1992 | Hornbeck ............ 359/223 | 5,281,957 A | 1/1994 | Schoolman ............ 345/8 |
| 5,177,724 A | 1/1993 | Gelbart ............ 369/44.16 | 5,285,105 A | 2/1994 | Cain ............... 257/672 |
| 5,178,728 A | 1/1993 | Boysel et al. ............ 156/656 | 5,285,196 A | 2/1994 | Gale, Jr. ............ 345/108 |
| 5,179,274 A | 1/1993 | Sampsell ............ 250/208.2 | 5,285,407 A | 2/1994 | Gale et al. ............ 365/189.11 |
| 5,179,367 A | 1/1993 | Shimizu ............ 340/700 | 5,287,096 A | 2/1994 | Thompson et al. ............ 345/147 |
| 5,181,231 A | 1/1993 | Parikh et al. ............ 377/26 | 5,287,215 A | 2/1994 | Warde et al. ............ 359/293 |
| 5,182,665 A | 1/1993 | O'Callaghan et al. ........ 359/95 | 5,289,172 A | 2/1994 | Gale, Jr. et al. ............ 345/108 |
| 5,185,660 A | 2/1993 | Um ............... 358/60 | 5,291,317 A | 3/1994 | Newswanger ............ 359/15 |
| 5,185,823 A | 2/1993 | Kaku et al. ............ 385/2 | 5,291,473 A | 3/1994 | Pauli ............ 369/112 |
| 5,188,280 A | 2/1993 | Nakao et al. ............ 228/123 | 5,293,511 A | 3/1994 | Poradish et al. ............ 257/434 |
| 5,189,404 A | 2/1993 | Masimo et al. ............ 340/720 | 5,296,408 A | 3/1994 | Wilbarg et al. ............ 437/203 |
| 5,189,505 A | 2/1993 | Bartelink ............ 257/419 | 5,296,891 A | 3/1994 | Vogt et al. ............ 355/67 |
| 5,191,405 A | 3/1993 | Tomita et al. ............ 257/777 | 5,296,950 A | 3/1994 | Lin et al. ............ 359/9 |
| 5,192,864 A | 3/1993 | McEwen et al. ............ 250/234 | 5,298,460 A | 3/1994 | Nishiguchi et al. ............ 437/183 |
| 5,192,946 A | 3/1993 | Thompson et al. ............ 340/794 | 5,299,037 A | 3/1994 | Sakata ............ 359/41 |
| 5,198,895 A | 3/1993 | Vick ............ 358/103 | 5,299,289 A | 3/1994 | Omae et al. ............ 359/95 |
| D334,557 S | 4/1993 | Hunter et al. ............ D14/114 | 5,300,813 A | 4/1994 | Joshi et al. ............ 257/752 |
| D334,742 S | 4/1993 | Hunter et al. ............ D14/113 | 5,301,062 A | 4/1994 | Takahashi et al. ............ 359/567 |
| 5,202,785 A | 4/1993 | Nelson ............... 359/214 | 5,303,043 A | 4/1994 | Glenn ............ 348/40 |
| 5,206,629 A | 4/1993 | DeMond et al. ............ 340/719 | 5,303,055 A | 4/1994 | Hendrix et al. ............ 348/761 |
| 5,206,829 A | 4/1993 | Thakoor et al. ............ 365/117 | 5,307,056 A | 4/1994 | Urbanus ............ 340/189 |
| 5,208,818 A | 5/1993 | Gelbart et al. ............ 372/30 | 5,307,185 A | 4/1994 | Jones et al. ............ 359/41 |
| 5,208,891 A | 5/1993 | Prysner ............ 385/116 | 5,310,624 A | 5/1994 | Ehrlich ............ 430/322 |
| 5,210,637 A | 5/1993 | Puzey ............ 359/263 | 5,311,349 A | 5/1994 | Anderson et al. ............ 359/223 |
| 5,212,115 A | 5/1993 | Cho et al. ............ 437/208 | 5,311,360 A | 5/1994 | Bloom et al. ............ 359/572 |
| 5,212,555 A | 5/1993 | Stoltz ............ 358/206 | 5,312,513 A | 5/1994 | Florence et al. ............ 156/643 |
| 5,212,582 A | 5/1993 | Nelson ............ 359/224 | 5,313,479 A | 5/1994 | Florence ............ 372/26 |
| 5,214,308 A | 5/1993 | Nishiguchi et al. ............ 257/692 | 5,313,648 A | 5/1994 | Ehlig et al. ............ 395/800 |
| 5,214,419 A | 5/1993 | DeMond et al. ............ 340/794 | 5,313,835 A | 5/1994 | Dunn ............ 73/505 |
| 5,214,420 A | 5/1993 | Thompson et al. ............ 340/795 | 5,315,418 A | 5/1994 | Sprague et al. ............ 359/41 |
| 5,216,278 A | 6/1993 | Lin et al. ............ 257/688 | 5,315,423 A | 5/1994 | Hong ............ 359/124 |
| 5,216,537 A | 6/1993 | Hornbeck ............ 359/291 | 5,315,429 A | 5/1994 | Abramov |
| 5,216,544 A | 6/1993 | Horikawa et al. ............ 359/622 | 5,319,214 A | 6/1994 | Gregory et al. ............ 250/504 R |
| 5,219,794 A | 6/1993 | Satoh et al. ............ 437/209 | 5,319,668 A | 6/1994 | Luecke ............ 372/107 |
| 5,220,200 A | 6/1993 | Blanton ............ 257/778 | 5,319,789 A | 6/1994 | Ehlig et al. ............ 395/800 |
| 5,221,400 A | 6/1993 | Staller et al. ............ 156/292 | 5,319,792 A | 6/1994 | Ehlig et al. ............ 395/800 |
| 5,221,982 A | 6/1993 | Faris ............ 359/93 | 5,320,709 A | 6/1994 | Bowden et al. ............ 437/745 |
| 5,224,088 A | 6/1993 | Atiya ............ 369/97 | 5,321,416 A | 6/1994 | Bassett et al. ............ 345/8 |
| D337,320 S | 7/1993 | Hunter et al. ............ D14/113 | 5,323,002 A | 6/1994 | Sampsell et al. ............ 250/252.1 |
| 5,226,099 A | 7/1993 | Mignardi et al. ............ 385/19 | 5,323,051 A | 6/1994 | Adams et al. ............ 257/417 |
| 5,229,597 A | 7/1993 | Fukatsu | 5,325,116 A | 6/1994 | Sampsell ............ 346/108 |
| 5,230,005 A | 7/1993 | Rubino et al. ............ 372/20 | 5,327,286 A | 7/1994 | Sampsell et al. ............ 359/561 |
| 5,231,363 A | 7/1993 | Sano et al. ............ 332/109 | 5,329,289 A | 7/1994 | Sakamoto et al. ............ 345/126 |
| 5,231,388 A | 7/1993 | Stoltz ............ 340/783 | 5,330,301 A | 7/1994 | Brancher ............ 414/417 |
| 5,231,432 A | 7/1993 | Glenn ............ 353/31 | 5,330,878 A | 7/1994 | Nelson ............ 430/311 |
| 5,233,456 A | 8/1993 | Nelson ............ 359/214 | 5,331,454 A | 7/1994 | Hornbeck ............ 359/224 |
| 5,233,460 A | 8/1993 | Partlo et al. ............ 359/247 | 5,334,991 A | 8/1994 | Wells et al. ............ 345/8 |
| 5,233,874 A | 8/1993 | Putty et al. ............ 73/517 AV | 5,339,116 A | 8/1994 | Urbanus et al. ............ 348/716 |
| 5,237,340 A | 8/1993 | Nelson ............ 346/108 | 5,339,177 A | 8/1994 | Jenkins et al. ............ 359/35 |
| 5,237,435 A | 8/1993 | Kurematsu et al. ............ 359/41 | 5,340,772 A | 8/1994 | Rosotker ............ 437/226 |

| | | | |
|---|---|---|---|
| 5,345,521 A | 9/1994 | McDonald et al. ............ 385/19 |
| 5,347,321 A | 9/1994 | Gove ......................... 348/663 |
| 5,347,378 A | 9/1994 | Handschy et al. ............ 359/53 |
| 5,347,433 A | 9/1994 | Sedlmayr ..................... 362/32 |
| 5,348,619 A | 9/1994 | Bohannon et al. .......... 156/664 |
| 5,349,687 A | 9/1994 | Ehlig et al. ................. 395/800 |
| 5,351,052 A | 9/1994 | D'Hont et al. ................ 342/42 |
| 5,352,926 A | 10/1994 | Andrews .................... 257/717 |
| 5,354,416 A | 10/1994 | Okudaira et al. ........... 156/643 |
| 5,357,369 A | 10/1994 | Pilling et al. ............... 359/462 |
| 5,357,803 A | 10/1994 | Lane ....................... 73/517 B |
| 5,359,349 A | 10/1994 | Jambor et al. .............. 345/168 |
| 5,359,451 A | 10/1994 | Gelbart et al. .............. 359/285 |
| 5,361,131 A | 11/1994 | Tekemori et al. ........... 356/355 |
| 5,363,220 A | 11/1994 | Kuwayama et al. ........... 359/3 |
| 5,365,283 A | 11/1994 | Doherty et al. ............. 348/743 |
| 5,367,585 A | 11/1994 | Ghezzo et al. ................ 385/23 |
| 5,371,543 A | 12/1994 | Anderson ................... 348/270 |
| 5,371,618 A | 12/1994 | Tai et al. ..................... 359/53 |
| 5,382,961 A | 1/1995 | Gale, Jr. ..................... 345/108 |
| 5,387,924 A | 2/1995 | Gale, Jr. et al. ............. 345/108 |
| 5,389,182 A | 2/1995 | Mignardi .................... 156/344 |
| 5,391,881 A | 2/1995 | Jeuch et al. ........... 250/370.09 |
| 5,392,140 A | 2/1995 | Ezra et al. .................... 359/41 |
| 5,392,151 A | 2/1995 | Nelson ....................... 359/223 |
| 5,394,303 A | 2/1995 | Yamaji ....................... 361/749 |
| 5,398,071 A | 3/1995 | Gove et al. ................. 348/558 |
| 5,399,898 A | 3/1995 | Rostoker .................... 257/499 |
| 5,404,365 A | 4/1995 | Hiiro ........................... 372/27 |
| 5,404,485 A | 4/1995 | Ban ........................... 395/425 |
| 5,408,123 A | 4/1995 | Murai ......................... 257/531 |
| 5,410,315 A | 4/1995 | Huber ......................... 342/42 |
| 5,411,769 A | 5/1995 | Hornbeck ................... 427/534 |
| 5,412,186 A | 5/1995 | Gale .......................... 219/679 |
| 5,412,501 A | 5/1995 | Fisli ........................... 359/286 |
| 5,418,584 A | 5/1995 | Larson ....................... 353/122 |
| 5,420,655 A | 5/1995 | Shimizu ....................... 353/33 |
| 5,420,722 A | 5/1995 | Bielak ........................ 359/708 |
| 5,426,072 A | 6/1995 | Finnila ....................... 437/208 |
| 5,427,975 A | 6/1995 | Sparks et al. ................. 437/79 |
| 5,430,524 A | 7/1995 | Nelson ....................... 355/200 |
| 5,435,876 A | 7/1995 | Alfaro et al. ............... 156/247 |
| 5,438,477 A | 8/1995 | Pasch ......................... 361/689 |
| 5,439,731 A | 8/1995 | Li et al. ...................... 428/209 |
| 5,442,411 A | 8/1995 | Urbanus et al. ............ 348/771 |
| 5,442,414 A | 8/1995 | Janssen et al. ............... 353/98 |
| 5,444,566 A | 8/1995 | Gale et al. .................. 359/291 |
| 5,445,559 A | 8/1995 | Gale et al. .................. 451/388 |
| 5,446,479 A | 8/1995 | Thompson et al. .......... 345/139 |
| 5,447,600 A | 9/1995 | Webb ........................... 216/2 |
| 5,448,314 A | 9/1995 | Heimbuch et al. .......... 348/743 |
| 5,448,546 A | 9/1995 | Pauli .......................... 369/112 |
| 5,450,088 A | 9/1995 | Meier et al. .................. 342/51 |
| 5,450,219 A | 9/1995 | Gold et al. ................... 359/40 |
| 5,451,103 A | 9/1995 | Hatanaka et al. ............ 353/31 |
| 5,452,024 A | 9/1995 | Sampsell .................... 348/755 |
| 5,452,138 A | 9/1995 | Mignardi et al. ........... 359/855 |
| 5,453,747 A | 9/1995 | D'Hont et al. ................ 342/42 |
| 5,453,778 A | 9/1995 | Venkateswar et al. ...... 347/239 |
| 5,453,803 A | 9/1995 | Shapiro et al. .............. 353/119 |
| 5,454,160 A | 10/1995 | Nickel ......................... 29/840 |
| 5,454,906 A | 10/1995 | Baker et al. .................. 216/66 |
| 5,455,445 A | 10/1995 | Kurtz et al. ................. 257/419 |
| 5,455,455 A | 10/1995 | Badehi ....................... 257/690 |
| 5,455,602 A | 10/1995 | Tew ........................... 347/130 |
| 5,457,493 A | 10/1995 | Leddy et al. ................ 348/164 |
| 5,457,566 A | 10/1995 | Sampsell et al. ............ 359/292 |
| 5,457,567 A | 10/1995 | Shinohara .................. 359/305 |
| 5,458,716 A | 10/1995 | Alfaro et al. ............... 156/245 |
| 5,459,492 A | 10/1995 | Venkateswar ............... 347/253 |
| 5,459,528 A | 10/1995 | Pettitt ........................ 348/568 |
| 5,459,592 A | 10/1995 | Shibatani et al. ............. 359/40 |
| 5,459,610 A | 10/1995 | Bloom et al. ............... 359/572 |
| 5,461,197 A | 10/1995 | Hiruta et al. .............. 174/52.4 |
| 5,461,410 A | 10/1995 | Venkateswar et al. ...... 347/240 |
| 5,461,411 A | 10/1995 | Florence et al. ............ 347/240 |
| 5,461,547 A | 10/1995 | Ciupke et al. ................ 362/31 |
| 5,463,347 A | 10/1995 | Jones et al. ................. 330/253 |
| 5,463,497 A | 10/1995 | Muraki et al. .............. 359/618 |
| 5,465,175 A | 11/1995 | Woodgate et al. .......... 359/463 |
| 5,467,106 A | 11/1995 | Salomon ...................... 345/87 |
| 5,467,138 A | 11/1995 | Gove ......................... 348/452 |
| 5,467,146 A | 11/1995 | Huang et al. ............... 348/743 |
| 5,469,302 A | 11/1995 | Lim .......................... 359/846 |
| 5,471,341 A | 11/1995 | Warde et al. ............... 359/293 |
| 5,473,512 A | 12/1995 | Degani et al. .............. 361/760 |
| 5,475,236 A | 12/1995 | Yoshizaki .................... 257/48 |
| 5,480,839 A | 1/1996 | Ezawa et al. ............... 437/209 |
| 5,481,118 A | 1/1996 | Tew .......................... 250/551 |
| 5,481,133 A | 1/1996 | Hsu .......................... 257/621 |
| 5,482,564 A | 1/1996 | Douglas et al. ............... 134/18 |
| 5,482,818 A | 1/1996 | Nelson ....................... 430/394 |
| 5,483,307 A | 1/1996 | Anderson .................... 353/98 |
| 5,485,172 A | 1/1996 | Sawachika et al. ............ 345/8 |
| 5,485,304 A | 1/1996 | Kaeriyama .................. 359/291 |
| 5,485,354 A | 1/1996 | Ciupke et al. ................ 362/31 |
| 5,486,698 A | 1/1996 | Hanson et al. .............. 250/332 |
| 5,486,841 A | 1/1996 | Hara et al. ...................... 345/8 |
| 5,486,946 A | 1/1996 | Jachimowicz et al. ....... 359/263 |
| 5,488,431 A | 1/1996 | Gove et al. ................. 348/716 |
| 5,489,952 A | 2/1996 | Gove et al. ................. 348/771 |
| 5,490,009 A | 2/1996 | Venkateswar et al. ...... 359/291 |
| 5,491,510 A | 2/1996 | Gove .......................... 348/77 |
| 5,491,612 A | 2/1996 | Nicewarner, Jr. ........... 361/760 |
| 5,491,715 A | 2/1996 | Flaxl ......................... 375/344 |
| 5,493,177 A | 2/1996 | Muller et al. ............... 313/578 |
| 5,493,439 A | 2/1996 | Engle ........................ 359/292 |
| 5,497,172 A | 3/1996 | Doherty et al. .............. 345/85 |
| 5,497,197 A | 3/1996 | Gove et al. ................. 348/388 |
| 5,497,262 A | 3/1996 | Kaeriyama .................. 359/223 |
| 5,499,060 A | 3/1996 | Gove et al. ................. 348/651 |
| 5,499,062 A | 3/1996 | Urbanus ..................... 348/771 |
| 5,500,761 A | 3/1996 | Goossen et al. ............ 359/290 |
| 5,502,481 A | 3/1996 | Dentinger et al. ............ 348/51 |
| 5,504,504 A | 4/1996 | Markandey et al. ........ 345/214 |
| 5,504,514 A | 4/1996 | Nelson ....................... 347/130 |
| 5,504,575 A | 4/1996 | Stafford ..................... 356/330 |
| 5,504,614 A | 4/1996 | Webb et al. ................. 359/223 |
| 5,506,171 A | 4/1996 | Leonard et al. ............. 437/187 |
| 5,506,597 A | 4/1996 | Thompson et al. ........... 345/85 |
| 5,506,720 A | 4/1996 | Yoon ......................... 359/224 |
| 5,508,558 A | 4/1996 | Robinette, Jr. et al. ...... 257/700 |
| 5,508,561 A | 4/1996 | Tago et al. .................. 257/737 |
| 5,508,565 A | 4/1996 | Hatakeyama et al. ....... 257/777 |
| 5,508,750 A | 4/1996 | Hewlett et al. ............. 348/558 |
| 5,508,840 A | 4/1996 | Vogel et al. ................ 359/291 |
| 5,508,841 A | 4/1996 | Lin et al. .................... 359/318 |
| 5,510,758 A | 4/1996 | Fujita et al. ................ 333/247 |
| 5,510,824 A | 4/1996 | Nelson ....................... 347/130 |
| 5,512,374 A | 4/1996 | Wallace et al. ............. 428/422 |
| 5,512,748 A | 4/1996 | Hanson ...................... 250/332 |
| 5,515,076 A | 5/1996 | Thompson et al. .......... 345/139 |
| 5,516,125 A | 5/1996 | McKenna ...................... 279/3 |
| 5,517,340 A | 5/1996 | Doany et al. ................. 359/41 |
| 5,517,347 A | 5/1996 | Sampsell .................... 359/224 |
| 5,517,357 A | 5/1996 | Shibayama ................. 359/547 |
| 5,517,359 A | 5/1996 | Gelbart ...................... 359/623 |
| 5,519,251 A | 5/1996 | Sato et al. ................... 257/666 |
| 5,519,450 A | 5/1996 | Urbanus et al. ............ 348/600 |
| 5,521,748 A | 5/1996 | Sarraf ........................ 359/321 |
| 5,523,619 A | 6/1996 | McAllister et al. ......... 257/686 |
| 5,523,628 A | 6/1996 | Williams et al. ............ 257/777 |

| | | | |
|---|---|---|---|
| 5,523,803 A | 6/1996 | Urbanus et al. ............ 348/771 |
| 5,523,878 A | 6/1996 | Wallace et al. ............. 359/290 |
| 5,523,881 A | 6/1996 | Florence et al. ............ 359/561 |
| 5,523,920 A | 6/1996 | Machuga et al. ........... 361/767 |
| 5,524,155 A | 6/1996 | Weaver ....................... 385/24 |
| 5,534,107 A | 7/1996 | Gray et al. ............... 156/643.1 |
| 5,534,883 A | 7/1996 | Koh ............................. 345/3 |
| 5,539,422 A | 7/1996 | Heacock et al. ............... 345/8 |
| 5,544,306 A | 8/1996 | Deering et al. ............. 395/164 |
| 5,552,635 A | 9/1996 | Kim et al. ................... 257/706 |
| 5,554,304 A | 9/1996 | Suzuki ........................ 216/2 |
| 5,576,878 A | 11/1996 | Henck ........................ 359/224 |
| 5,602,671 A | 2/1997 | Hornbeck ................... 359/224 |
| 5,606,181 A | 2/1997 | Sakuma et al. ............... 257/88 |
| 5,606,447 A | 2/1997 | Asada et al. ................. 359/199 |
| 5,610,438 A | 3/1997 | Wallace et al. ............. 257/682 |
| 5,623,361 A | 4/1997 | Engle ......................... 359/291 |
| 5,629,566 A | 5/1997 | Doi et al. ................... 257/789 |
| 5,629,801 A | 5/1997 | Staker et al. ................ 359/572 |
| 5,640,216 A | 6/1997 | Hasegawa et al. ............ 349/58 |
| 5,658,698 A | 8/1997 | Yagi et al. .................... 430/11 |
| 5,661,592 A | 8/1997 | Bornstein et al. ........... 359/291 |
| 5,661,593 A | 8/1997 | Engle ......................... 359/292 |
| 5,663,817 A | 9/1997 | Frapin et al. ................... 349/5 |
| 5,668,611 A | 9/1997 | Ernstoff et al. ............. 348/771 |
| 5,673,139 A | 9/1997 | Johnson ..................... 359/291 |
| 5,677,783 A | 10/1997 | Bloom et al. ............... 359/224 |
| 5,689,361 A | 11/1997 | Damen et al. .............. 359/284 |
| 5,691,836 A | 11/1997 | Clark .......................... 359/247 |
| 5,694,740 A | 12/1997 | Martin et al. ................. 53/431 |
| 5,696,560 A | 12/1997 | Songer ...................... 348/436 |
| 5,699,740 A | 12/1997 | Gelbart ...................... 101/477 |
| 5,704,700 A | 1/1998 | Kappel et al. ................ 353/31 |
| 5,707,160 A | 1/1998 | Bowen ....................... 400/472 |
| 5,712,649 A | 1/1998 | Tosaki ........................... 345/8 |
| 5,713,652 A | 2/1998 | Zavracky et al. ........... 353/122 |
| 5,726,480 A | 3/1998 | Pister ......................... 257/415 |
| 5,731,802 A | 3/1998 | Aras et al. .................. 345/148 |
| 5,734,224 A | 3/1998 | Tagawa et al. ............. 313/493 |
| 5,742,373 A | 4/1998 | Alvelda ...................... 349/204 |
| 5,744,752 A | 4/1998 | McHerron et al. ......... 174/52.4 |
| 5,745,271 A | 4/1998 | Ford et al. .................. 359/130 |
| 5,757,354 A | 5/1998 | Kawamura ................. 345/126 |
| 5,757,536 A | 5/1998 | Ricco et al. ................ 359/291 |
| 5,764,280 A | 6/1998 | Bloom et al. ................. 348/53 |
| 5,768,009 A | 6/1998 | Little ........................... 359/293 |
| 5,773,473 A | 6/1998 | Green et al. ................. 438/26 |
| 5,793,519 A | 8/1998 | Furlani et al. .............. 359/291 |
| 5,798,743 A | 8/1998 | Bloom ........................ 345/90 |
| 5,798,805 A | 8/1998 | Ooi et al. ..................... 349/10 |
| 5,801,074 A | 9/1998 | Kim et al. .................. 438/107 |
| 5,802,222 A | 9/1998 | Rasch et al. .................. 385/1 |
| 5,808,323 A | 9/1998 | Spaeth et al. ................ 257/88 |
| 5,808,797 A | 9/1998 | Bloom et al. ............... 359/572 |
| 5,815,126 A | 9/1998 | Fan et al. ....................... 345/8 |
| 5,825,443 A | 10/1998 | Kawasaki et al. ............ 349/95 |
| 5,832,148 A | 11/1998 | Yariv ........................... 385/16 |
| 5,835,255 A | 11/1998 | Miles ......................... 359/291 |
| 5,835,256 A | 11/1998 | Huibers ...................... 359/291 |
| 5,837,562 A | 11/1998 | Cho ............................ 438/51 |
| 5,841,579 A | 11/1998 | Bloom et al. ............... 359/572 |
| 5,841,929 A | 11/1998 | Komatsu et al. ............ 385/129 |
| 5,844,711 A | 12/1998 | Long, Jr. .................... 359/291 |
| 5,847,859 A | 12/1998 | Murata ....................... 359/201 |
| 5,862,164 A | 1/1999 | Hill ............................. 372/27 |
| 5,868,854 A | 2/1999 | Kojima et al. .............. 134/1.3 |
| 5,886,675 A | 3/1999 | Aye et al. ...................... 345/7 |
| 5,892,505 A | 4/1999 | Tropper ...................... 345/208 |
| 5,895,233 A | 4/1999 | Higashi et al. ............. 438/107 |
| 5,898,515 A | 4/1999 | Furlani et al. .............. 359/290 |
| 5,903,243 A | 5/1999 | Jones ............................ 345/7 |
| 5,903,395 A | 5/1999 | Rallison et al. ............. 359/630 |
| 5,910,856 A | 6/1999 | Ghosh et al. ............... 359/291 |
| 5,912,094 A | 6/1999 | Aksyuk et al. ................. 430/5 |
| 5,912,608 A | 6/1999 | Asada ......................... 335/222 |
| 5,914,801 A | 6/1999 | Dhuler et al. ............... 359/230 |
| 5,915,168 A | 6/1999 | Salatino et al. ............. 438/110 |
| 5,919,548 A | 7/1999 | Barron et al. ............... 428/138 |
| 5,920,411 A | 7/1999 | Duck et al. ................. 359/127 |
| 5,920,418 A | 7/1999 | Shiono et al. ............... 359/246 |
| 5,923,475 A | 7/1999 | Kurtz et al. ................. 359/619 |
| 5,926,309 A | 7/1999 | Little .......................... 359/293 |
| 5,926,318 A | 7/1999 | Hebert ........................ 359/618 |
| 5,942,791 A | 8/1999 | Shorrocks et al. .......... 257/522 |
| 5,949,390 A | 9/1999 | Nomura et al. ............... 345/32 |
| 5,949,570 A | 9/1999 | Shiono et al. ............... 359/291 |
| 5,953,161 A | 9/1999 | Troxell et al. .............. 359/618 |
| 5,955,771 A | 9/1999 | Kurtz et al. ................. 257/419 |
| 5,963,788 A | 10/1999 | Barron et al. ................. 438/48 |
| 5,978,127 A | 11/1999 | Berg ........................... 359/279 |
| 5,982,553 A | 11/1999 | Bloom et al. ............... 359/627 |
| 5,986,634 A | 11/1999 | Alioshin et al. ............ 345/126 |
| 5,986,796 A | 11/1999 | Miles ......................... 359/260 |
| 5,995,303 A | 11/1999 | Honguh et al. ............. 359/708 |
| 5,999,319 A | 12/1999 | Castracane ................. 359/573 |
| 6,004,912 A | 12/1999 | Gudeman .................. 508/577 |
| 6,012,336 A | 1/2000 | Eaton et al. ................... 73/754 |
| 6,016,222 A | 1/2000 | Setani et al. ................ 359/571 |
| 6,025,859 A | 2/2000 | Ide et al. .................... 347/135 |
| 6,038,057 A | 3/2000 | Brazas, Jr. et al. ......... 359/291 |
| 6,040,748 A | 3/2000 | Gueissaz ..................... 335/78 |
| 6,046,840 A | 4/2000 | Huibers ...................... 359/291 |
| 6,055,090 A | 4/2000 | Miles ......................... 359/291 |
| 6,057,520 A | 5/2000 | Goodwin-Johansson .... 200/181 |
| 6,061,166 A | 5/2000 | Furlani et al. .............. 359/254 |
| 6,061,489 A | 5/2000 | Ezra et al. .................. 385/115 |
| 6,062,461 A | 5/2000 | Sparks et al. ............. 228/123.1 |
| 6,064,404 A | 5/2000 | Aras et al. .................. 345/507 |
| 6,069,392 A | 5/2000 | Tai et al. .................... 257/419 |
| 6,071,652 A | 6/2000 | Feldman et al. ............... 430/5 |
| 6,075,632 A | 6/2000 | Braun ........................ 359/124 |
| 6,084,626 A | 7/2000 | Ramanujan et al. ........ 347/239 |
| 6,088,102 A | 7/2000 | Manhart ..................... 356/354 |
| 6,090,717 A | 7/2000 | Powell et al. ............... 438/710 |
| 6,091,521 A | 7/2000 | Popovich .................... 359/15 |
| 6,096,576 A | 8/2000 | Corbin et al. ............... 438/108 |
| 6,096,656 A | 8/2000 | Matzke et al. .............. 438/702 |
| 6,097,352 A | 8/2000 | Zavracky et al. ............. 345/7 |
| 6,101,036 A | 8/2000 | Bloom ........................ 359/567 |
| 6,115,168 A | 9/2000 | Zhao et al. .................. 359/247 |
| 6,122,299 A | 9/2000 | DeMars et al. ............... 372/20 |
| 6,123,985 A | 9/2000 | Robinson et al. ........... 427/162 |
| 6,124,145 A | 9/2000 | Stemme et al. ............... 438/26 |
| 6,130,770 A | 10/2000 | Bloom ........................ 359/224 |
| 6,144,481 A | 11/2000 | Kowarz et al. .............. 359/291 |
| 6,147,789 A | 11/2000 | Gelbart ....................... 359/231 |
| 6,154,259 A | 11/2000 | Hargis et al. ............... 348/756 |
| 6,154,305 A | 11/2000 | Dickensheets et al. |
| 6,163,026 A | 12/2000 | Bawolek et al. ............ 250/351 |
| 6,163,402 A | 12/2000 | Chou et al. ................. 359/443 |
| 6,169,624 B1 | 1/2001 | Godil et al. ................. 359/237 |
| 6,172,796 B1 * | 1/2001 | Kowarz et al. .............. 359/290 |
| 6,172,797 B1 | 1/2001 | Huibers ...................... 359/291 |
| 6,177,980 B1 | 1/2001 | Johnson ....................... 355/67 |
| 6,181,458 B1 | 1/2001 | Brazas, Jr. et al. ......... 359/290 |
| 6,188,519 B1 | 2/2001 | Johnson ..................... 359/572 |
| 6,195,196 B1 | 2/2001 | Kimura et al. .............. 359/295 |
| 6,197,610 B1 | 3/2001 | Toda .......................... 438/50 |
| 6,210,988 B1 | 4/2001 | Howe et al. .................. 438/50 |
| 6,215,579 B1 | 4/2001 | Bloom et al. ............... 359/298 |
| 6,219,015 B1 | 4/2001 | Bloom et al. ................. 345/87 |
| 6,222,954 B1 | 4/2001 | Riza ............................ 385/18 |

| | | | | | | | | |
|---|---|---|---|---|---|---|---|---|
| 6,229,650 | B1 | 5/2001 | Reznichenko et al. | 359/566 | EP | 0 801 319 A1 | 10/1997 | G02B/26/00 |
| 6,229,683 | B1 | 5/2001 | Goodwin-Johansson | 361/233 | EP | 0 851 492 A2 | 7/1998 | H01L/23/538 |
| 6,241,143 | B1 | 6/2001 | Kuroda | 228/110.1 | EP | 1 003 071 A2 | 5/2000 | G03B/27/72 |
| 6,249,381 | B1 | 6/2001 | Suganuma | 359/618 | EP | 1 014 143 A1 | 6/2000 | G02B/26/00 |
| 6,251,842 | B1 | 6/2001 | Gudeman | 508/577 | EP | 1 040 927 A2 | 10/2000 | B41J/2/455 |
| 6,252,697 | B1 | 6/2001 | Hawkins et al. | 359/290 | GB | 2 117 564 A | 10/1983 | H01L/25/08 |
| 6,254,792 | B1 | 7/2001 | Van Buskirk et al. | 216/13 | GB | 2 118 365 A | 10/1983 | H01L/27/13 |
| 6,261,494 | B1 | 7/2001 | Zavracky et al. | 264/104 | GB | 2 266 385 A | 10/1993 | G02B/23/10 |
| 6,268,952 | B1 | 7/2001 | Godil et al. | 359/291 | GB | 2 296 152 A | 6/1996 | H04N/13/04 |
| 6,271,145 | B1 | 8/2001 | Toda | 438/706 | GB | 2 319 424 A | 5/1998 | H04N/13/04 |
| 6,271,808 | B1 | 8/2001 | Corbin | 345/7 | JP | 63-305323 | 12/1988 | G02F/1/13 |
| 6,274,469 | B1 | 8/2001 | Yu | 438/592 | JP | 40-1155637 | 6/1989 | H01L/21/92 |
| 6,282,213 | B1 | 8/2001 | Gutin et al. | 372/20 | JP | 2219092 | 8/1990 | G09G/3/28 |
| 6,290,859 | B1 | 9/2001 | Fleming et al. | 216/2 | WO | WO 90/13913 | 11/1990 | H01L/23/10 |
| 6,290,864 | B1 | 9/2001 | Patel et al. | 216/79 | WO | WO 92/12506 | 7/1992 | G09F/9/37 |
| 6,300,148 | B1 | 10/2001 | Birdsley et al. | 438/15 | WO | WO 93/02269 | 2/1993 | E06B/5/10 |
| 6,303,986 | B1 | 10/2001 | Shook | 257/680 | WO | WO 93/09472 | 5/1993 | G03F/7/20 |
| 6,310,018 | B1 | 10/2001 | Behr et al. | 510/175 | WO | WO 93/18428 | 9/1993 | G02B/27/00 |
| 6,313,901 | B1 | 11/2001 | Cacharelis | 349/187 | WO | WO 93/22694 | 11/1993 | G02B/5/18 |
| 6,323,984 | B1 | 11/2001 | Trisnadi | 359/245 | WO | WO 94/09473 | 4/1994 | G09G/3/34 |
| 6,327,071 | B1 | 12/2001 | Kimura | 359/291 | WO | WO 94/29761 | 12/1994 | G02B/27/24 |
| 6,342,960 | B1 | 1/2002 | McCullough | 359/124 | WO | WO 95/11473 | 4/1995 | G02B/27/00 |
| 6,346,430 | B1 | 2/2002 | Raj et al. | 438/64 | WO | WO 96/02941 | 2/1996 | H01L/23/02 |
| 6,356,577 | B1 | 3/2002 | Miller | 372/107 | WO | WO 96/08031 | 3/1996 | H01J/29/12 |
| 6,356,689 | B1 | 3/2002 | Greywall | 385/52 | WO | WO 96/41217 | 12/1996 | G02B/5/18 |
| 6,359,333 | B1 | 3/2002 | Wood et al. | 257/704 | WO | WO 96/41224 | 12/1996 | G02B/19/00 |
| 6,384,959 | B1 | 5/2002 | Furlani et al. | 359/291 | WO | WO 97/22033 | 6/1997 | G02B/27/22 |
| 6,387,723 | B1 | 5/2002 | Payne et al. | 438/48 | WO | WO 97/26569 | 7/1997 | G02B/5/18 |
| 6,392,309 | B1 | 5/2002 | Wataya et al. | 257/796 | WO | WO 98/05935 | 2/1998 | G01L/9/06 |
| 6,396,789 | B1 | 5/2002 | Guerra et al. | 369/112 | WO | WO 98/24240 | 6/1998 | H04N/9/31 |
| 6,418,152 | B1 | 7/2002 | Davis | 372/18 | WO | WO 98/41893 | 9/1998 | G02B/26/08 |
| 6,421,179 | B1 | 7/2002 | Gutin et al. | 359/572 | WO | WO 99/07146 | 2/1999 | H04N/7/16 |
| 6,438,954 | B1 | 8/2002 | Goetz et al. | | WO | WO 99/12208 | 3/1999 | H01L/25/065 |
| 6,445,502 | B1 * | 9/2002 | Islam et al. | 359/671 | WO | WO 99/23520 | 5/1999 | G02B/26/08 |
| 6,452,260 | B1 | 9/2002 | Corbin et al. | 257/686 | WO | WO 99/34484 | 7/1999 | |
| 6,466,354 | B1 | 10/2002 | Gudeman | 359/247 | WO | WO 99/59335 | 11/1999 | H04N/5/765 |
| 6,479,811 | B1 | 11/2002 | Kruschwitz et al. | 250/237 G | WO | WO 99/63388 | 12/1999 | G02B/27/22 |
| 6,480,634 | B1 | 11/2002 | Corrigan | 385/4 | WO | WO 99/67671 | 12/1999 | G02B/26/08 |
| 6,497,490 | B1 | 12/2002 | Miller | 359/614 | WO | WO 00/04718 | 1/2000 | H04N/7/167 |
| 6,525,863 | B1 | 2/2003 | Riza | 359/290 | WO | WO 00/07225 | 2/2000 | H01L/21/00 |
| 6,563,974 | B2 | 5/2003 | Agha Riza | 385/18 | WO | WO 01/04674 A1 | 1/2001 | G02B/6/12 |
| 6,565,222 | B1 | 5/2003 | Ishii et al. | 359/883 | WO | WO 01/006297 A3 | 1/2001 | G02B/27/10 |
| 6,569,717 | B1 | 5/2003 | Murade | 438/149 | WO | WO 01/57581 A3 | 8/2001 | G02B/27/48 |
| 2001/0019454 | A1 | 9/2001 | Tadic-Galeb et al. | 359/649 | WO | WO 02/025348 A3 | 3/2002 | G02B/26/02 |
| 2002/0015230 | A1 | 2/2002 | Pilossof et al. | 359/558 | WO | WO 02/31575 A2 | 4/2002 | G02B/27/00 |
| 2002/0021485 | A1 | 2/2002 | Pilossof | 359/295 | WO | WO 02/058111 A2 | 7/2002 | |
| 2002/0079432 | A1 | 6/2002 | Lee et al. | 250/216 | WO | WO 02/065184 A3 | 8/2002 | G02B/27/12 |
| 2002/0105725 | A1 | 8/2002 | Sweatt et al. | 359/566 | WO | WO 02/073286 A2 | 9/2002 | G02B/26/08 |
| 2002/0112746 | A1 | 8/2002 | DeYoung et al. | 134/36 | WO | WO 02/084375 A1 | 10/2002 | G02B/26/08 |
| 2002/0131228 | A1 | 9/2002 | Potter | 361/233 | WO | WO 02/084397 A3 | 10/2002 | G02B/27/18 |
| 2002/0131230 | A1 | 9/2002 | Potter | 361/277 | WO | WO 03/001281 A1 | 1/2003 | G02F/1/01 |
| 2002/0135708 | A1 | 9/2002 | Murden et al. | 349/19 | WO | WO 03/001716 A1 | 1/2003 | H04J/14/02 |
| 2002/0176151 | A1 | 11/2002 | Moon et al. | 359/298 | WO | WO 03/012523 A1 | 2/2003 | G02B/26/00 |
| 2002/0195418 | A1 | 12/2002 | Kowarz et al. | 216/13 | WO | WO 03/016965 A1 | 2/2003 | G02B/5/18 |
| 2002/0196492 | A1 | 12/2002 | Trisnadi et al. | 398/79 | WO | WO 03/023849 A1 | 3/2003 | H01L/23/02 |
| 2003/0056078 | A1 | 3/2003 | Johansson et al. | 711/200 | WO | WO 03/025628 A2 | 3/2003 | |

FOREIGN PATENT DOCUMENTS

| | | | | |
|---|---|---|---|---|
| EP | 0 488 326 A3 | 6/1992 | | G09G/3/28 |
| EP | 0 499 566 A2 | 8/1992 | | G06F/3/033 |
| EP | 0 528 646 A1 | 2/1993 | | G09G/3/02 |
| EP | 0 530 760 A2 | 3/1993 | | G09G/3/34 |
| EP | 0 550 189 A1 | 7/1993 | | G02F/1/315 |
| EP | 0 610 665 A1 | 8/1994 | | G09G/3/34 |
| EP | 0 627 644 A2 | 12/1994 | | G02B/27/00 |
| EP | 0 627 850 A1 | 12/1994 | | H04N/5/64 |
| EP | 0 643 314 A2 | 3/1995 | | G02B/27/00 |
| EP | 0 654 777 A1 | 5/1995 | | G09G/3/34 |
| EP | 0 658 868 A1 | 6/1995 | | G09G/3/34 |
| EP | 0 658 830 A1 | 12/1995 | | G09G/3/34 |
| EP | 0 689 078 A1 | 12/1995 | | G02B/26/08 |

OTHER PUBLICATIONS

O. Solgaard, "Integrated Semiconductor Light Modulators for Fiber–Optic and Display Applications", Ph.D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R, Gerhard–Multhaupt, "Viscoelastic Spatial Light Modulators and Schileren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7th International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems", GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alveida, "VLSI Microdisplays and Optoelectric Technology," MIT, pp. 1–93, 1995.

P. Alveida, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp. 255–269, 1997.

Buhler et al., "Linear Array of Complementary Metal Oxide Semiconductor Double–Pass Metal Micromirrors," Optical Engineering, vol. 36, No. 2, pp. 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings,* Sensors and Actuators A, pp. 7–15, 1998.

R.N. Thomas, et al., "The Mirro–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997. pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Developmemt of Digital MEMS–Based Display Technology Promises Improved Resolution, Contrast, and Speed, XP–000730009, 1997, pp. 33 of 34.

"Micromachined Opto/Electro/Mechanical Systems," Electronic Systems, NASA Tech. Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment", IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminum Mirror," Physical Electronics Laboratory, 1991 IEEE, pp. 547–550.

M. Parameswaran et al., "Commercial CMOS Fabricated Integrated Dynamic Thermal Scene Simulator," 1991 IEEE, pp. 29.4.1–29.4.4

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M. Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modeling of CMOS Compatible High Voltage Device Structures," pp. 41–50.

Jon Gildemeister, "Xenon Difluoride Etching System," 1997, UC Berkeley MicroTabrication Manual Chapter 7.15, p. 2–5.

W. Riethmuller et al., "A Smart accelerometer with on–chip electronics fabricated by a commercial CMOS process," Sensors and Actuators A. 31, (1992), 121–124.

W. Gopel et al., "Sensors– A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the Al/SiO2 interfaces," 1985 American Institute of Physics, pp. 5256–52616.

Daniel L. Flamm et al., "XeF2 and F–Atom Reactions with Si: Their Significance for Plasma Etching,," Solid State Technology, V. 26, #4, 4/83, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P. C. Kundu et al., "Reduction of Speckle Noise by Varing the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID '99, San Jose, CA, 27 pgs, 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"High Energy Variable Attenuators," Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Mircomirror Devices™", Tribology Letters, No. 3, pp. 239–247, 1997.

K. W. Goosen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in Al/$Si_3N_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

* cited by examiner

TILT-ABLE GRATING PLANE FOR IMPROVED CROSSTALK IN 1×N BLAZE SWITCHES

FIELD OF THE INVENTION

The present invention relates to an apparatus for tilting the grating plane of a stepped blaze grating. More particularly, this invention relates to tilting the grating plane for improved crosstalk in 1×N blaze switches.

BACKGROUND OF THE INVENTION

Bloom et al. in U.S. Pat. No. 5,311,360, entitled "Method and Apparatus for Modulating a Light Beam," teach a grating light valve™ light modulator which operates in a reflection mode and a diffraction mode. The grating light valve™ light modulator type device includes elongated elements suspended above a substrate. In the reflective mode, reflective surfaces of the grating light valve™ light modulator type device cause incident light to constructively combine to form reflected light. In the diffractive mode, the reflective surfaces of the grating light valve™ light modulator type device are separated by a quarter wavelength of the incident light to produce diffracted light. When the grating light valve™ light modulator type device is in the diffractive mode, the grating light valve™ light modulator type device predominantly diffracts light into a plus one diffraction order and a minus one diffraction order but also diffracts a small amount of light into higher diffraction orders.

Bloom et al. further teach an alternative grating light valve™ light modulator type device in which the elongated elements include off-axis neck portions at ends of each of the elongated elements. In a non-activated mode, the elongated elements are parallel causing incident light to reflect from the elongated elements and, thus, produce the reflected light. In an activated mode, each of the elongated elements is rotated about an axis defined by the off-axis neck portions to diffract light in a similar manner as a sawtooth grating.

Because the light modulator is switched between the non-activated mode and the activated mode and because the non-activated mode diffracts small quantities of light into the same angles as does the activated mode, a contrast between the non-activated state and the activated state is less than an optimum contrast.

The co-owned, co-filed, and co-pending U.S. patent application, Ser. No. 09/930,838, entitled BLAZED GRATING LIGHT VALVE teach a diffractive light modulator, which operates in a reflection mode and a diffraction mode. The diffractive light modulator includes elongated elements arranged in groups. The elongated elements within each group are progressively stepped downward. The groups of elements lie in a plane parallel to a substrate. The co-owned, co-filed, and co-pending U.S. patent application Ser. No. 09/930,838, entitled BLAZED GRATING LIGHT VALVE is hereby incorporated by reference.

Light directed into plus or minus first orders, or higher orders, can be collected as different outputs of an optical switch. However, since light modulators diffract small portions of light into angles other than an intended primary diffraction angle, this can lead to crosstalk, which is interference from adjacent channels. What is needed is a light modulator that minimizes crosstalk in switching applications.

SUMMARY OF THE INVENTION

Embodiments of the present invention include a light modulator. The light modulator includes elongated elements arranged parallel to each other. Each elongated element includes a light reflective planar surface with the light reflective planar surfaces configured in a first grating plane. A support structure is coupled to the elongated elements to maintain a position of the elongated elements relative to each other and to enable movement of each elongated element in a direction normal to the first grating plane. The support structure enables movement between a first modulator configuration and a second modulator configuration. In the first modulator configuration, the elongated elements act to reflect incident light as a plane mirror. In the second modulator configuration, the elongated elements form a stepped blaze configuration along a second grating plane lying at a grating angle to the first grating plane and act to diffract the incident light into at least two diffraction orders.

A diffraction angle of each diffraction order can be dependent on the grating angle. The stepped blaze configuration can include a plurality of blaze elements thereby forming stepped blaze elements, and each blaze element can include a plurality of adjacent elongated elements configured as a stepped blaze grating thereby forming stepped elongated elements. Each blaze element can be separated by a blaze element height difference from an adjacent blaze element. The grating angle can be about an arctangent of the blaze element height difference divided by a blaze element pitch. The incident light can impinge the elongated elements normal to the first grating plane such that the at least two diffraction orders comprise a first positive diffraction order and a first negative diffraction order. The first positive diffraction order can be at a first splus order blaze angle of about an arcsine of a wavelength of the incident light divided by the blaze element pitch minus a sine of the grating angle, the grating angle is then subtracted from the arcsine result. The first negative diffraction order can be at a first negative order blaze angle of about an arcsine of a negative of the wavelength of the incident light divided by the blaze element pitch minus the sine of the grating angle, the grating angle is then subtracted from the arcsine result. The at least two diffraction orders can further comprise a near zero order diffraction order at a near zero order blaze angle of about two times the grating angle.

The blaze element pitch can comprise a sum of a width of each elongated element within the blaze element. Each elongated element within the blaze element can be separated by a constant height difference. The stepped elongated elements within each blaze element can form a positive slope while the stepped blaze elements form a positive slope. The stepped elongated elements within each blaze element can form a negative slope while the stepped blaze elements form a negative slope. The stepped elongated elements within each blaze element can form a positive slope while the stepped blaze elements form a negative slope. The stepped elongated elements within each blaze element can form a negative slope while the stepped blaze elements form a positive slope. The light modulator can comprise a diffractive light modulator. The diffractive light modulator can comprise a grating light valve™ light modulator type device. Each elongated element can further comprise a first conductive element. The light modulator can further comprise a substrate couple to the support structure. The substrate can comprise a second conductive element such that in operation an electrical bias applied between the first conductive element and the second conductive element enables movement of each of the elongated elements.

DETAILED DESCRIPTION OF THE EMBODIMENTS

Figure 1:
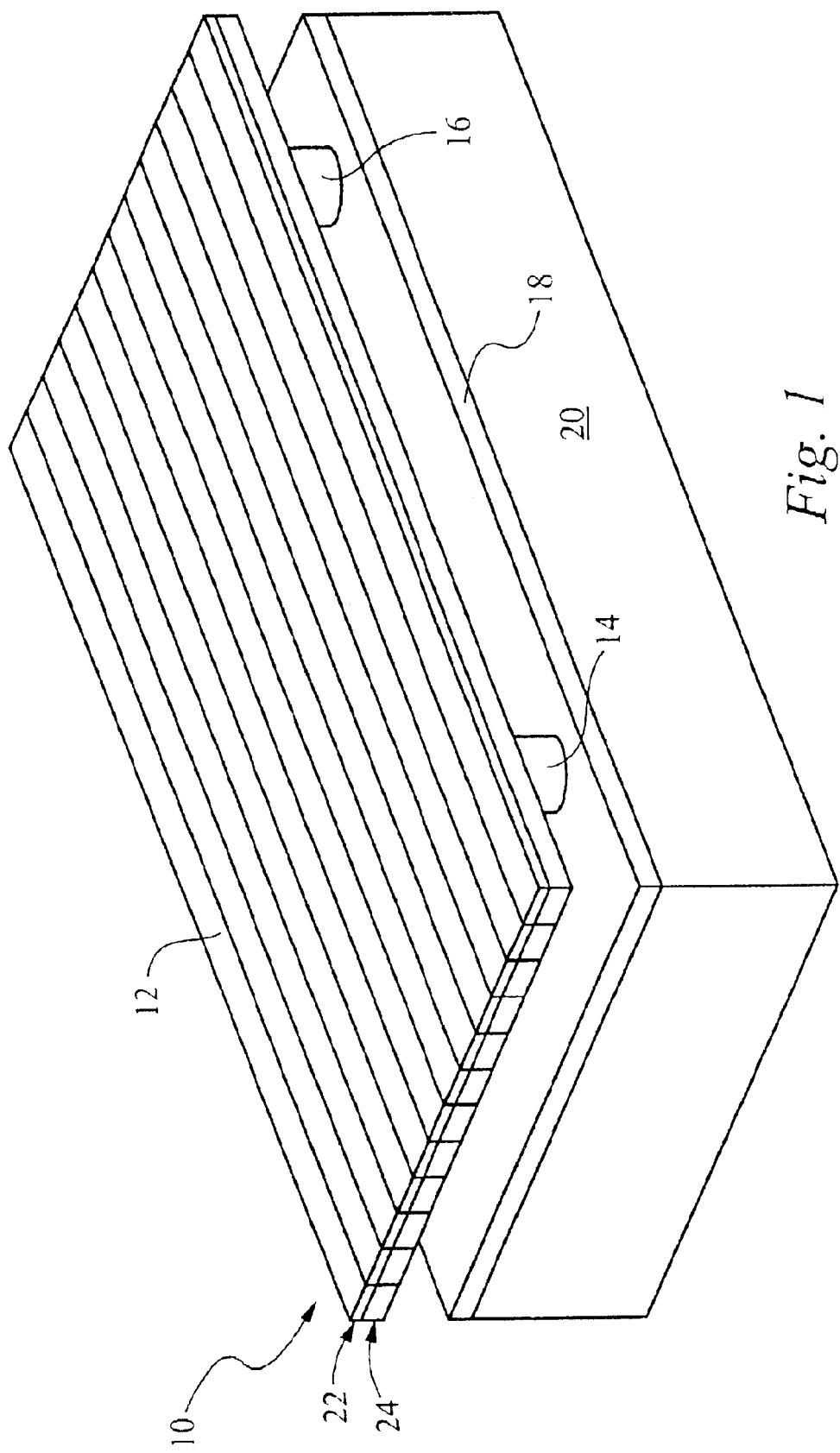
FIG. 1 illustrates an isometric view of a diffractive light modulator according to the preferred embodiment of the present invention.

A diffractive light modulator 10 according to the preferred embodiment of the present invention is shown in FIG. 1. Preferably, the diffractive light modulator is a grating light valve™ light modulator type device. The diffractive light modulator 10 comprises elongated elements 12 suspended by first and second posts, 14 and 16, above a substrate 20. Preferably, the elongated elements 12 are ribbons of the grating light valve™ light modulator type device. The substrate 20 comprises a conductor 18. In operation, the diffractive light modulator 10 operates to produce modulated light while operating in a reflection mode or a particular stepped blaze diffraction mode. Preferably, the light to be modulated comprises a wavelength, or channel, of incident light. Preferably, the incident light comprises wavelength division multiplexed (WDM) signals where each wavelength comprises an optical channel, as is well known in the art. Each channel impinges appropriate ones of the elongated elements on the diffractive light modulator. Preferably, each channel impinges 12 elongated elements 12. FIG. 1 illustrates a single optical channel. It is understood that the diffractive light modulator can include more, or less, elongated elements 12 than that shown in FIG. 1. It is also understood that each optical channel can impinge more, or less, than 12 elongated elements as appropriate.

Figure 2:
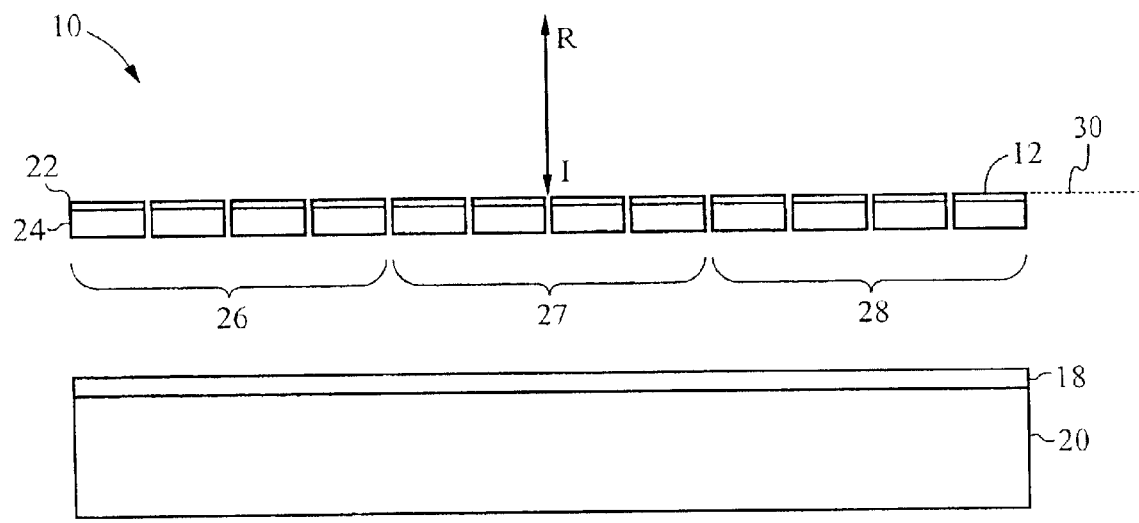
FIG. 2 illustrates a cross-section of the diffractive light modulator in a reflection mode.
Figure 3A:
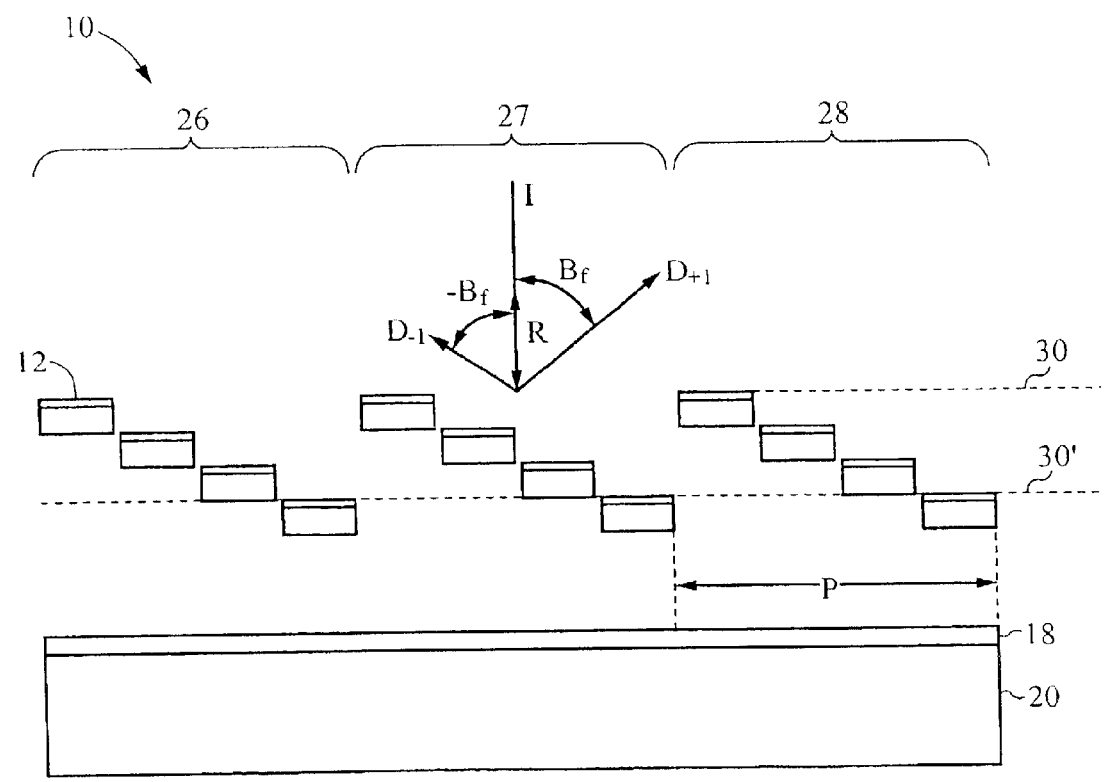
FIG. 3A illustrates a cross-section of the diffractive light modulator in a first blaze diffraction mode.
Figure 3B:
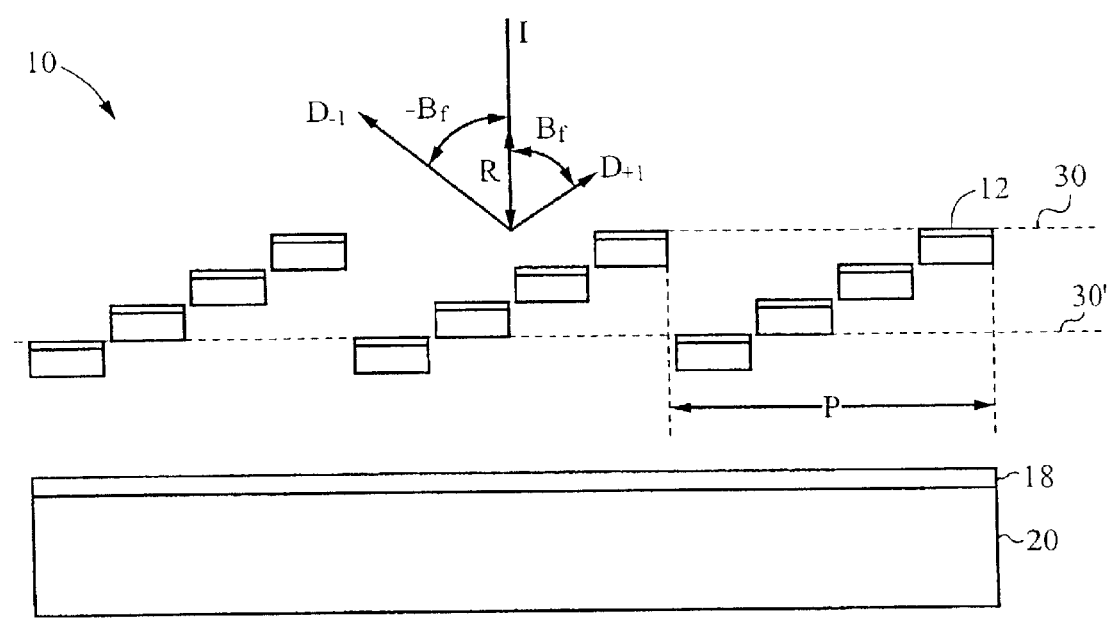
FIG. 3B illustrates a cross-section of the diffractive light modulator in a second blaze diffraction mode.

FIGS. 2, 3A, and 3B illustrate a cross-section of the diffractive light modulator 10 in a reflection mode, a first blaze diffraction mode, and a second blaze diffraction mode, respectively. The elongated elements 12 comprise a conducting and reflecting surface 22 and a resilient material 24. The substrate 20 comprises the conductor 18. The elongated elements 12 are preferably segmented into groups. Each group of elongated elements is called a blaze element. The first four elongated elements 12 comprise a blaze element 26. The middle four elongated elements 12 comprise a blaze element 27. The last four elongated elements comprise a blaze element 28. Each blaze element 26, 27, and 28 includes a blaze pitch P.

FIG. 2 depicts the diffractive light modulator 10 in the reflection mode. In the reflection mode, the conducting and reflecting surfaces 22 of the elongated elements 12 form a first grating plane 30 so that incident light I reflects from the elongated elements 12 to produce reflected light R.

FIG. 3A depicts the diffractive light modulator 10 in the first blaze diffraction mode. In the first blaze diffraction mode, each blaze element forms a step of a stepped blaze grating. As can be seen in FIG. 3A, the elongated elements 12 within each blaze element 26, 27, 28 descend from left to right. The bottom elongated elements within each blaze element 26, 27, 28 form a second grating plane 30'. The first grating plane 30 and the second grating plane 30' are parallel to each other. In the first blaze diffraction mode, and the blaze diffraction modes to follow, an electrical bias causes selected ones of the elongated elements 12 to move toward the substrate 20. The electrical bias is selectively applied between the reflecting and conducting surfaces 22 of the elongated elements 12 and the conductor 18. The closer the elongated element 12 is to be moved toward the substrate 20, the more electrical bias is applied. In this manner, more electrical bias is applied to each descending step within the blaze elements 26, 27, 28 to form the steps. The selective electrical bias results in a height difference between each successive elongated element 12 within each stepped blaze element 26, 27, 28. Preferably, the height difference between each step in the blaze element 26, 27, 28 is the same. This is referred to as a symmetric stepped blaze. Preferably, no electrical bias is applied to the elongated element 12 corresponding to the top step in each of the blaze elements 26, 27, and 28 of this first blaze diffraction mode. A height difference of a quarter wavelength λ/4 of the incident light I between the top step and the bottom step of each blaze element 26, 27, 28 produces maximum diffracted light including plus one and minus one diffraction orders, $D_{+1}$ and $D_{-1}$. By varying the height difference between zero and λ/4 produces a variable greyscale effect. A blaze grating primarily diffracts light into a single direction. In the case of the first blaze diffraction mode, light is primarily diffracted into the plus one order, $D_{+1}$. Some light does diffract into non-primary directions, that is the zero order, reflected light R, and the minus one order, $D_{-1}$, as can be seen in FIG. 3A.

When the first grating plane 30 is parallel to the second grating plane 30', the plus one order light is diffracted at a diffraction angle βf expressed as:

$$\beta f = \arcsin(\lambda/P). \tag{1}$$

The minus one order light, in this case, is diffracted at a diffraction angel −βf.

FIG. 3B depicts the diffractive light modulator 10 in the second blaze diffraction mode. The second blaze diffraction mode is similar to the first blaze diffraction mode except that the elongated elements 12 within each blaze element 26, 27, 28 descend from right to left. In the case of the second blaze diffraction mode, light is primarily diffracted into the minus one order, $D_{-1}$. Some light does diffract into the zero order, reflected light R, and the plus one order, $D_{+1}$, as can be seen in FIG. 3B. As in the first blaze diffraction mode, the minus one order light is diffracted at the diffraction angle $-\beta f$, and the plus one order light is diffracted at the diffraction angle $\beta f$.

Since a stepped blaze grating primarily diffracts into one direction, the stepped blaze grating can be used effectively in switching applications. In such a switching application, each of the plus one order light and the minus one order light can be collected as output of a separate output port. By also counting the zero order, three output ports can be produced.

FIGS. 2, 3A, and 3B depict the diffractive light modulator 10 in the reflection, first blaze diffraction, and second blaze diffraction modes, respectively. For a height difference between the top and bottom steps in each blaze element 26, 27, 28 of less than about a quarter wavelength $\lambda/4$, the amount of diffraction into the zero order and non-primary first order increases. This increases the crosstalk between the primary first order and the non-primary first order light. In switching applications, diffraction of light into diffraction angles corresponding to non-switched channels increases crosstalk.

Figure 4:
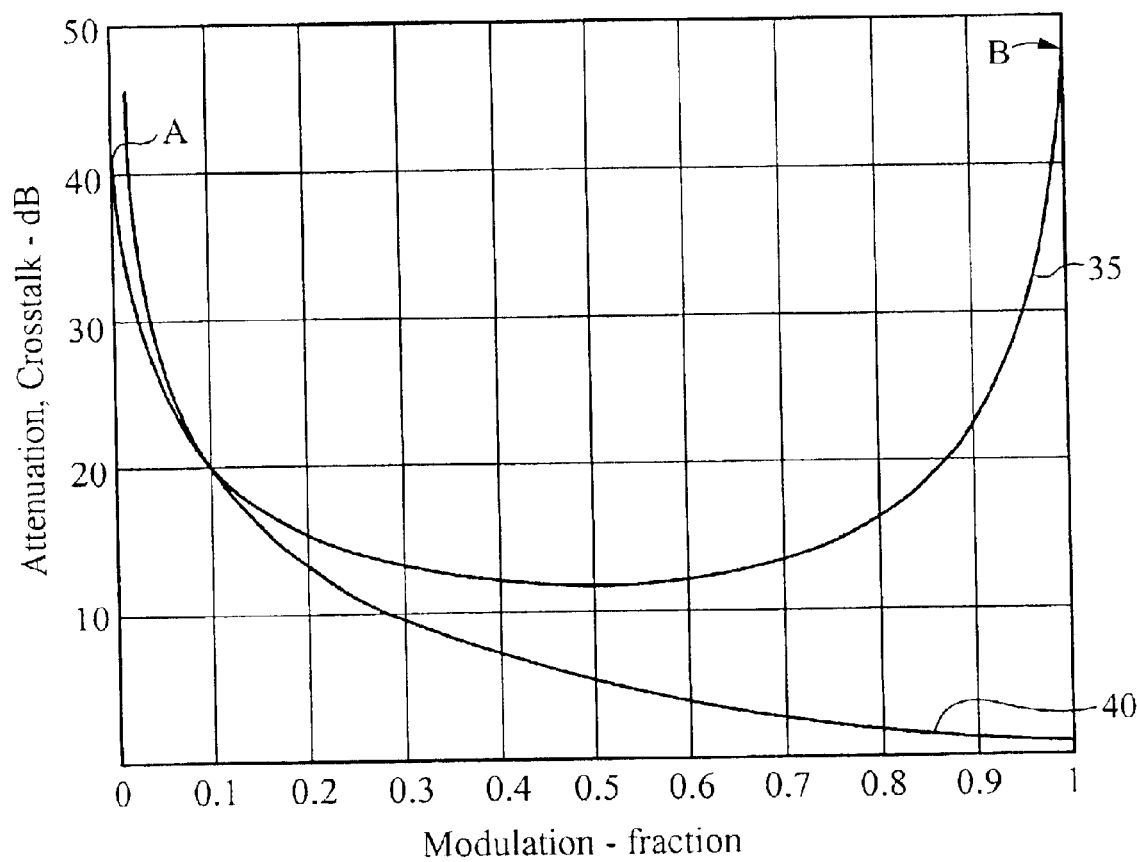
FIG. 4 illustrates an attenuation and crosstalk graph for a symmetric stepped blaze grating.

When symmetric stepped blaze gratings are used to switch incoming incident light into plus one and minus one orders, e.g. $D_{+1}$ and $D_{-1}$, the above characteristics of the first and second blaze diffraction modes comprise the crosstalk between the switched outputs. FIG. 4 illustrates an attenuation and crosstalk graph for a symmetric stepped blaze grating. A crosstalk curve 35 illustrates the crosstalk between plus first order light and zero order light. As can be seen in FIG. 4, the crosstalk curve 35 is U-shaped. At point A, the diffractive light modulator 10 is in the reflection mode, as in FIG. 2, and the elongated elements 12 within each blaze element are configured as a flat mirror. This provides good crosstalk for switching into the zero order. At point B, the diffractive light modulator 10 is in the first blaze diffraction mode, as in FIG. 3A, and the elongated elements 12 within each blaze element 26, 27, 28 are configured for maximum diffraction. This provides good crosstalk for switching into the plus first order. Recall that maximum diffraction occurs when the top step and the bottom step within each blaze element 26, 27, 28 are separated by a height difference of $\lambda/4$. The remainder of the crosstalk curve 35 between points A and B corresponds to the crosstalk when the blaze elements 26, 27, 28 are not configured as a flat mirror or for maximum diffraction.

An attenuation curve 40 illustrates the attenuation of the plus first order light. When the blaze elements are in the reflection mode, then approximately all of the plus first order light is attenuated (far left of the attenuation curve 40). When the blaze elements are in the first blaze diffraction mode, then a small amount of the plus first order light is attenuated (far right of the attenuation curve 40). Similar crosstalk and attenuation curves (not shown) exist for the crosstalk between minus first order light and zero order light, and the attenuation of the minus first order light, respectively.

It is clear from the graph illustrated in FIG. 4 that for moderate degrees of attenuation, the crosstalk is increased. For applications that require switching and attenuating, such an increase in crosstalk might prove prohibitive.

Figure 5A:
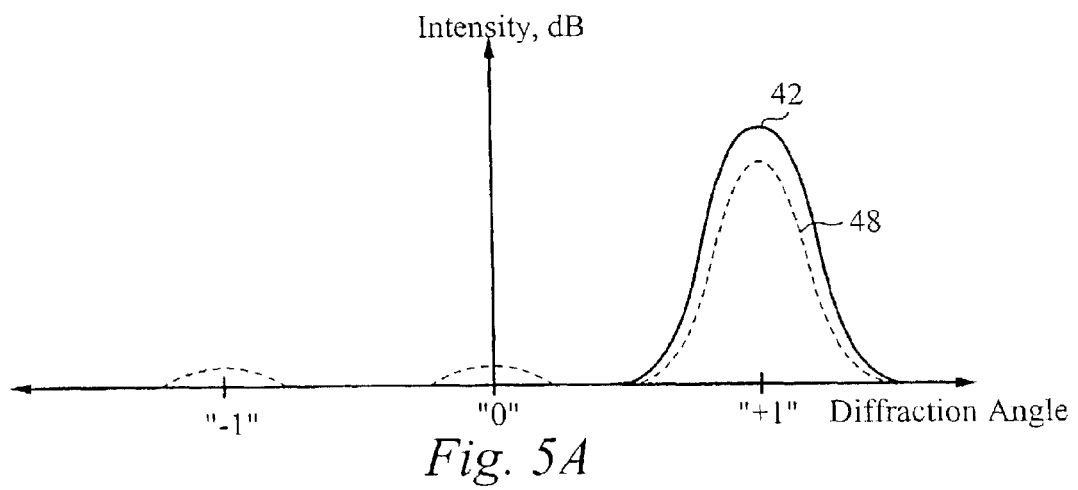
FIG. 5A illustrates an exemplary light energy distribution comparison of a straight switching application versus a switching and attenuation application while using the diffractive light modulator in the first blaze diffraction mode.

FIG. 5A illustrates an exemplary light energy distribution comparison of a straight switching application versus a switching and attenuation application while using a diffractive light modulator in the first blaze diffraction mode. Each signal within an optical channel is represented by an energy distribution. Preferably, the energy distribution form a gaussian curve. When a signal is diffracted into the plus first order light, a maxima of the signal energy distribution is diffracted at approximately the first order diffraction angel. The trailing edges of the energy distribution are diffracted at diffraction angles either slightly higher or lower than the first order diffraction angle. The plus first order diffraction angle is represented in FIG. 5A as "+1". In the case of the first blaze diffraction mode, the plus first order diffraction angle is $\beta f$ In a switching application, light can be collected at the plus first order diffraction angle as output of an output port, say output port 1. An energy distribution 42 represents the signal diffracted into the plus first order. Such a situation occurs when the blaze elements 26, 27, and 28 are configured for maximum diffraction in the first blaze diffraction mode, as in FIG. 3A. In the case of a straight switching application, the energy distribution 42 represents the signal switched into the output port 1.

Figure 5B:
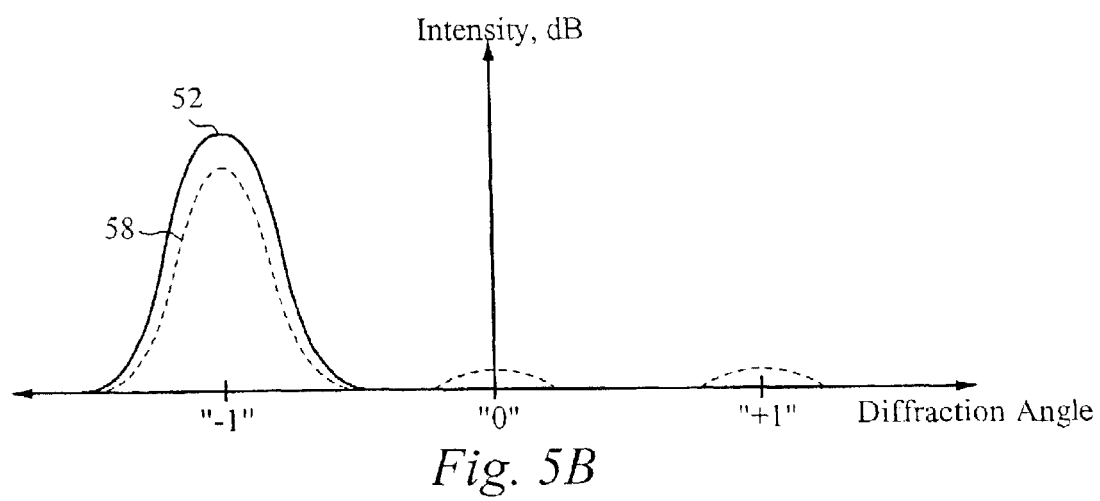
FIG. 5B illustrates an exemplary light energy distribution comparison of a straight switching application versus a switching and attenuation application while using the diffractive light modulator in the second blaze diffraction mode.

FIG. 5B illustrates an exemplary light energy distribution comparison of a straight switching application versus a switching and attenuation application while using a diffractive light modulator in the second blaze diffraction mode. If the blaze elements 26, 27, and 28 are configured for maximum diffraction in the second blaze diffraction mode, as in FIG. 3B, an energy distribution curve 52 represents the signal diffracted into the minus first order. In the case of the second blaze diffraction mode, the minus one first order diffraction angle is $-\beta f$. For the same input signal, the energy distribution curve 52 (FIG. 5B) is a mirror image of the energy distribution curve 42 (FIG. 5A). The minus first order light can then be collected as another output port, say output port 2. If the blaze elements 26, 27, and 28 are configured in the reflection mode, as in FIG. 2, then the reflected zero order can be collected as yet another output port, say output port 0.

It is understood that when a signal is switched to the plus first order, as illustrated by energy curve 42 in FIG. 5A, trace amounts of the signal are also reflected into the zero order and diffracted into the minus first order, as discussed above in relation to FIGS. 3A and 3B. Similarly, it is understood that when a signal is switched to the minus first order, trace amounts of the signal are also reflected into the zero order and diffracted into the plus first order. These trace amounts are not illustrated in FIGS. 5A and 5B.

If the signal is to be switched and attenuated, as in an energy distribution 48 in FIG. 5A, then the blaze elements 26, 27, and 28 are configured somewhere between the maximum diffraction state and the flat mirror state, depending on the required amount of attenuation. The more the signal that is to be attenuated at the output port 1, the closer the blaze elements are configured towards the flat state. However, as the signal is attenuated to the level of energy distribution 48, the attenuated portion of the signal is directed into the zero order and the minus first order, as shown in FIG. 5A. Since the zero order and minus first order are collected at output ports 0 and 2, respectively, the attenuated portion increases crosstalk between the output ports. A similar situation occurs when the signal is switched and attenuated at the output port 2, and the attenuated portion is directed to the zero order and the plus first order, as in energy distribution curve 58 in FIG. 5B.

Figure 6A:
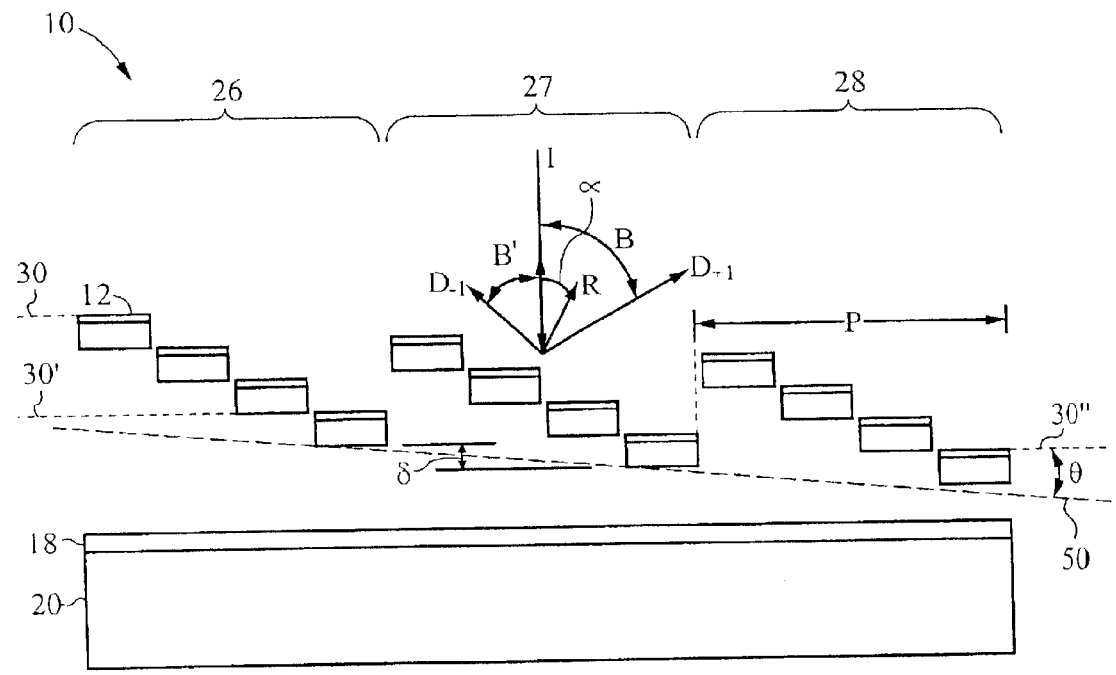
FIG. 6A illustrates a cross-section of the diffractive light modulator in a third blaze diffraction mode.
Figure 6B:
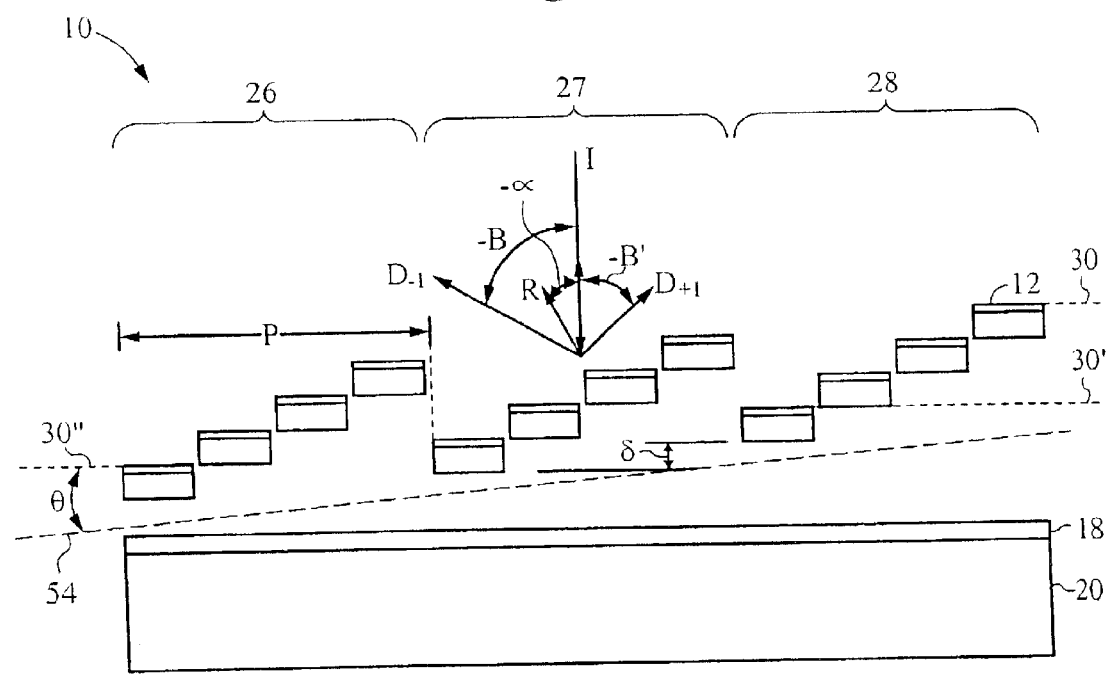
FIG. 6B illustrates a cross-section of the diffractive light modulator in a fourth blaze diffraction mode.

FIGS. 6A and 6B illustrate a cross-section of the diffractive light modulator 10 in a third blaze diffraction mode and a fourth blaze diffraction mode, respectively. The third and fourth blaze diffraction modes each form a tilted grating plane. By tilting the grating plane, the diffracted energy distribution curves are essentially shifted. Like elements between FIGS. 2, 3A, 3B, 6A, and 6B use the same reference numerals. In the third blaze diffraction mode illustrated in FIG. 6A, the blaze element 27 is pulled down further than the blaze element 26, and the blaze element 28 is pulled down further than the blaze element 27. This forms stepped blaze elements along a first tilted grating plane 50. A height difference between each blaze element 26, 27, 28 is δ. The blaze elements 26, 27, 28 and the elongated elements 12 within each blaze element 26, 27, 28 all step down from left to right. The bottom step of the blaze element 28 is the lowest portion of the stepped blaze elements and forms a third grating plane 30". The third grating plane 30" is parallel to the first and second grating planes 30 and 30', respectively. By configuring the blaze elements 26, 27, and 28 as left to right stepped blaze elements, the grating plane 30 is effectively rotated clockwise by a tilt angle θ. The tilt angle θ is determined by the periodicity of the blaze element, which is the blaze element pitch P, and the blaze element height difference δ. Specifically, the tilt angle θ can be expressed as:

$$\theta = \arctan(\delta/P). \quad (2)$$

By tilting the grating plane clockwise, the diffraction angles of the plus first order light, $D_{+1}$, the minus first order light, $D_{-1}$, and the reflected light R are also tilted clockwise. In this third blaze diffraction mode, a diffraction angle β for the plus first order light $D_{+1}$ is expressed as:

$$\beta = \arcsin(\lambda/P - \sin(\theta)) - \theta. \quad (3)$$

The zero order light is no longer reflected back along the incidence path. Instead, the zero order light is diffracted at a diffraction angle α, where α is expressed as:

$$\alpha = 2\leftarrow. \quad (4)$$

The minus first order light $D_{-1}$ is diffracted at a diffraction angle β', where β' is expressed as:

$$\beta' = \arcsin(-\lambda/P - \sin(\theta)) - \theta. \quad (5)$$

Figure 7A:
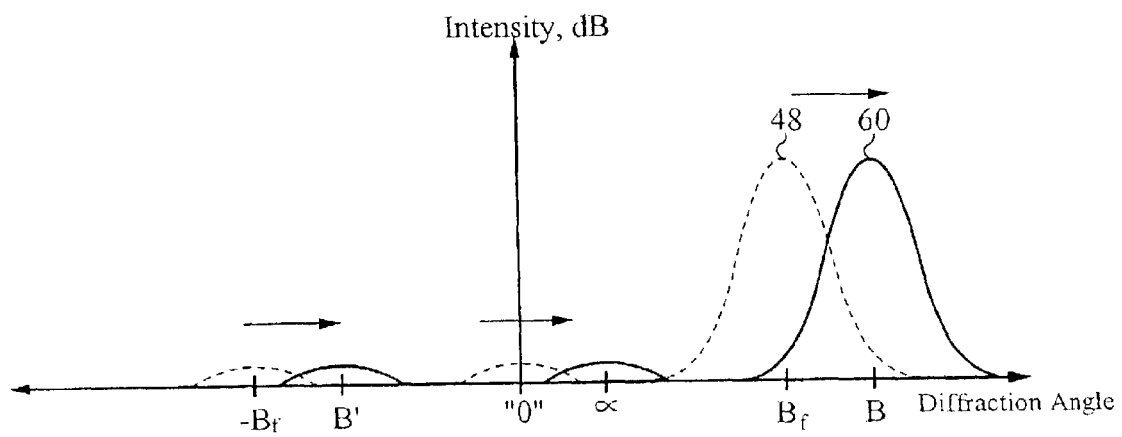
FIG. 7A illustrates a shift in the light energy distribution according to the third blaze diffraction mode.

Tilting the grating plane clockwise has the impact of shifting the diffracted energy distribution curve. The impact of tilting the grating plane according to the third blaze diffraction mode is illustrated in FIG. 7A. The energy distribution curve 48 is the energy distribution for the switching and attenuating application according to the first blaze diffraction mode as described in relation to FIG. 5A. An energy distribution curve 60 is the energy distribution curve 48 shifted to the right as a result of tilting the grating plane clockwise by the tilting angle θ. The maxima for the energy distribution curve 60 is now located at the shifted plus first order diffraction angle β. Similarly, the attenuated portions of the energy distribution curve 48 that were located at the diffraction angles 0 and −βf are also shifted to the right. The attenuated portion diffracted as zero order light is located at the diffraction angle α, and the attenuated portion diffracted as minus first order light is located at the diffraction angle β'.

It is understood that a similar impact is made when the diffractive light modulator 10 is used within a switching application. An energy distribution curve associated with a switched signal, e.g. the energy distribution curve 42 in FIG. 5A, is shifted to the right. In other words, the plus first order diffraction angle for the switched signal is rotated clockwise. The trace amounts of the signal that are diffracted into the zero order and the minus first order are also shifted to the right.

In the fourth blaze diffraction mode illustrated in FIG. 6B, tile blaze element 27 is pulled down further than the blaze element 28, and the blaze element 26 is pulled down further than the blaze element 27. This forms stepped blaze elements along a second tilted grating plane 54. The height difference between each blaze element 26, 27, 28 is δ. The blaze elements 26, 27, 28 and the elongated elements 12 within each blaze element 26, 27, 28 all step down from right to left. The bottom step of the blaze element 26 is the lowest portion of the stepped blaze elements and lies in the third grating plane 30". By configuring the blaze elements 26, 27, and 28 as right to left stepped blaze elements, the grating plane 30 is effectively rotated counter-clockwise by the tilt angle θ. By tilting the grating plane counter-clockwise, the diffraction angles of the plus first order light, $D_{+1}$, the minus first order light, $D_{-1}$, and the reflected light R are also tilted counter-clockwise. In this fourth blaze diffraction mode, the minus first order light $D_{-1}$ is diffracted at the diffraction angle −β. The zero order light is diffracted at the diffraction angle −α. The plus first order light $D_{+1}$ is diffracted at a diffraction angle −β'.

Figure 7B:
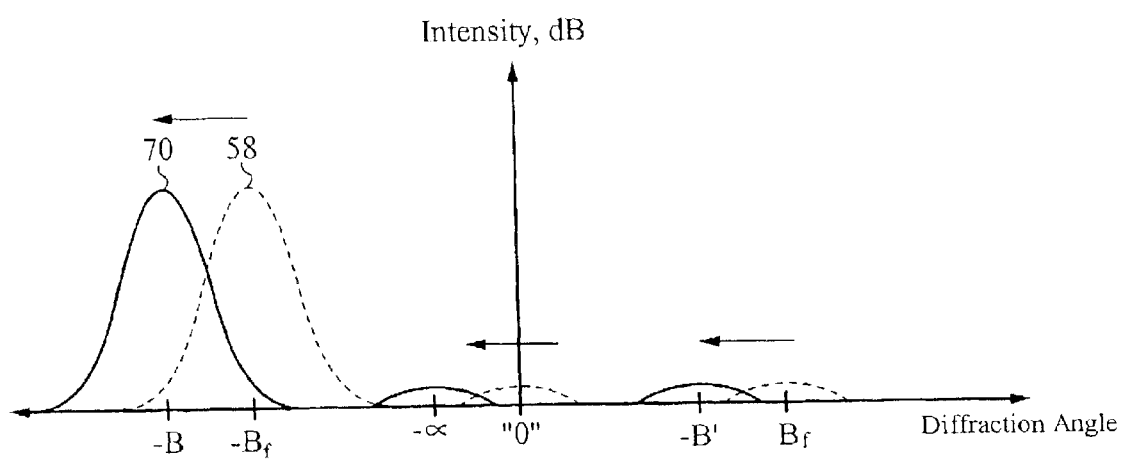
FIG. 7B illustrates a shift in the light energy distribution according to the fourth blaze diffraction mode.

FIG. 7B illustrates a shift in the light energy distribution according to the fourth blaze diffraction mode. The energy distribution curve 58 is the energy distribution for the switching and attenuating application according to the second blaze diffraction mode as described in relation to FIG. 5B. An energy distribution curve 70 is the energy distribution curve 58 shifted to the left as a result of tilting the grating plane counter-clockwise by the tilting angle θ. The maxima for the energy distribution curve 70 is now located at the shifted minus first order diffraction angle −β. Similarly, the attenuated portions of the energy distribution curve 58 that were located at the diffraction angles 0 and βf are also shifted to the left. The attenuated portion diffracted as zero order light is located at the diffraction angle −α, and the attenuated portion diffracted as plus first order light is located at the diffraction angle −β'.

It is understood that a similar impact is made when the diffractive light modulator 10 is used within a switching application. An energy distribution curve associated with a switched signal, e.g. the energy distribution curve 52 in FIG. 5B, is shifted to the left. In other words, the minus first order diffraction angle for the switched signal is rotated counter-clockwise. The trace amounts of the signal that are diffracted into the zero order and the plus first order are also shifted to the left.

A positive tilt is when the tilted grating plane slopes in the same direction as the steps of the elongated elements within the blaze elements. The third and fourth blaze diffraction modes both have positive tilt. For example, in the third blaze diffraction mode, the elongated elements 12 within each blaze element 26, 27, and 28 step down from left to right, and the blaze elements 26, 27, and 28 step down from left to right.

Figure 8A:
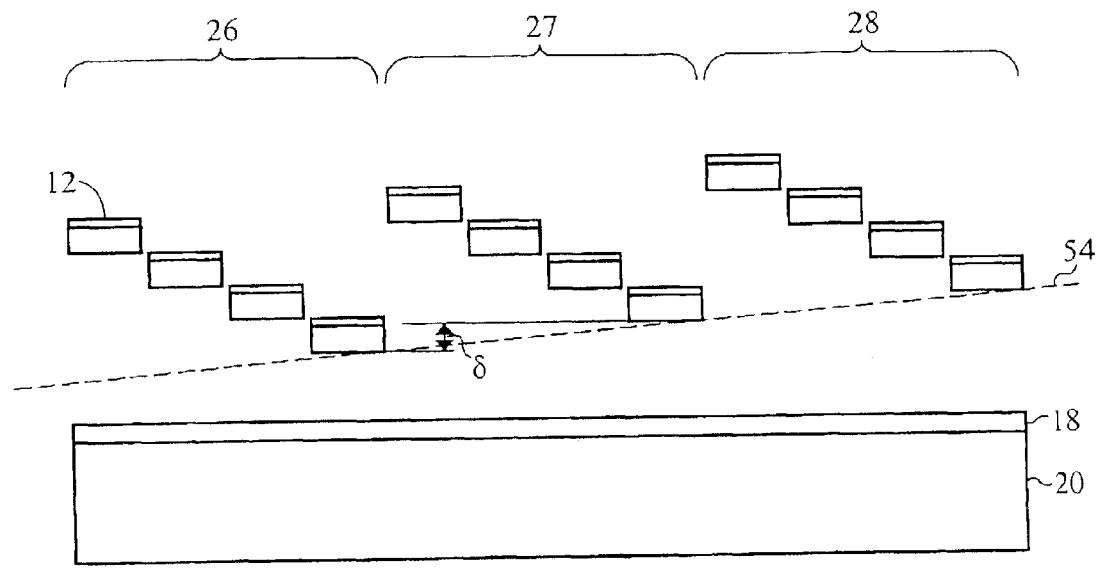
FIG. 8A illustrates a cross-section of the diffractive light modulator in a fifth blaze diffraction mode.

A negative tilt is when the tilted grating plane slopes in the opposite direction as the steps of the elongated elements within the blaze elements. FIG. 8A illustrates a cross-section of the diffractive light modulator 10 in a fifth blaze diffraction mode. In the fifth blaze diffraction mode, the elongated elements 12 are configured with a negative tilt. The elongated elements 12 within each of the blaze elements 26, 27, and 28 step down from left to right, and the blaze elements 26, 27, and 28 step down from right to left. Due to the elongated elements 12 stepping down from right to left, an energy distribution curve similar to the energy distribution curve 48 in FIGS. 5A and 7A is formed. However, since the blaze elements 26, 27, and 28 step down from right to left, the energy distribution curve in the case of this fifth blaze diffraction mode is shifted to the left, as opposed to the right as in the energy distribution curve 60 in FIG. 7A.

Figure 8B:
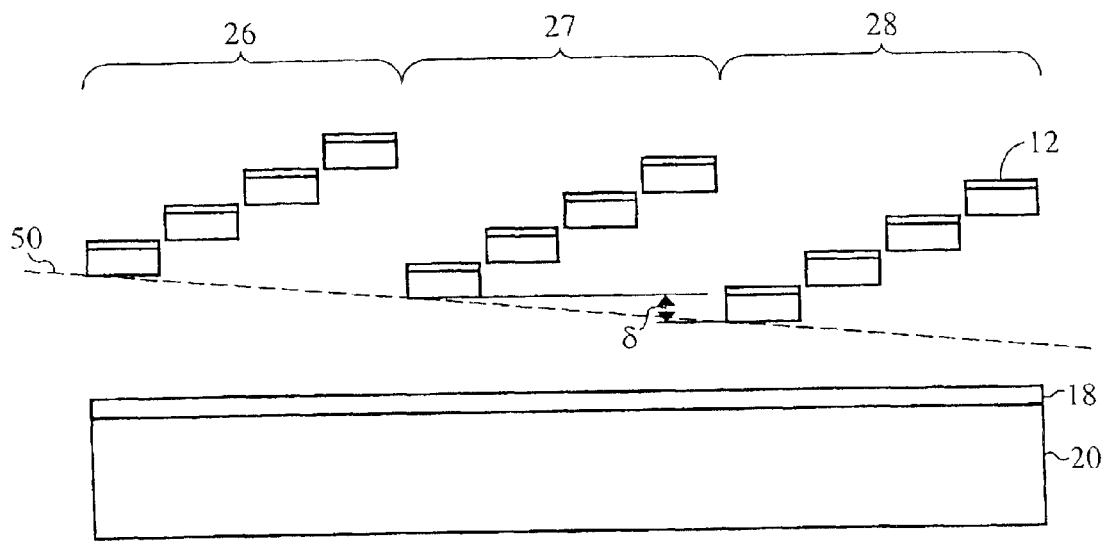
FIG. 8B illustrates a cross-section of the diffractive light modulator in a sixth blaze diffraction mode.

FIG. 8B illustrates a cross-section of the diffractive light modulator 10 in a sixth blaze diffraction mode. In the sixth blaze diffraction mode, the elongated elements 12 are configured with a negative tilt. The elongated elements 12 within each of the blaze elements 26, 27, and 28 step down from right to left, and the blaze elements 26, 27, and 28 step down from left to right. Due to the elongated elements 12 stepping down from left to right, an energy distribution curve similar to the energy distribution curve 58 in FIGS. 5B and 7B is formed. However, since the blaze elements 26, 27, and 28 step down from left to right, the energy distribution curve in the case of the sixth blaze diffraction mode is shifted to the right, as opposed to the left as in the energy distribution curve 70 in FIG. 7B.

While in the fifth blaze diffraction mode, a plus first order light corresponding to a first maxima can be collected as an output port, say output port 3. While in the sixth blaze diffraction mode, a minus first order light corresponding to a first maxima can be collected as an output port, say output port 4. It is understood that a diffraction angle corresponding to a plus first order light in the third blaze diffraction mode is not the same as a diffraction angle corresponding to a plus first order light in the fifth blaze diffraction mode. Each maxima of a shifted energy distribution curve is located at its corresponding first order diffraction angle. It is also understood that a diffraction angle corresponding to a minus first order light in the fourth blaze diffraction mode is not the same as a diffraction angle corresponding to a minus first order light in the sixth blaze diffraction mode. Preferably, the size of the tilt angle θ is sufficiently large such that the tail ends of any one of the energy distribution curves do not significantly overlap the maxima of any of the other energy distribution curves. Any significant overlap can increase the crosstalk to such a point that use of the blaze diffraction modes in a switching application becomes impractical.

Figure 9:
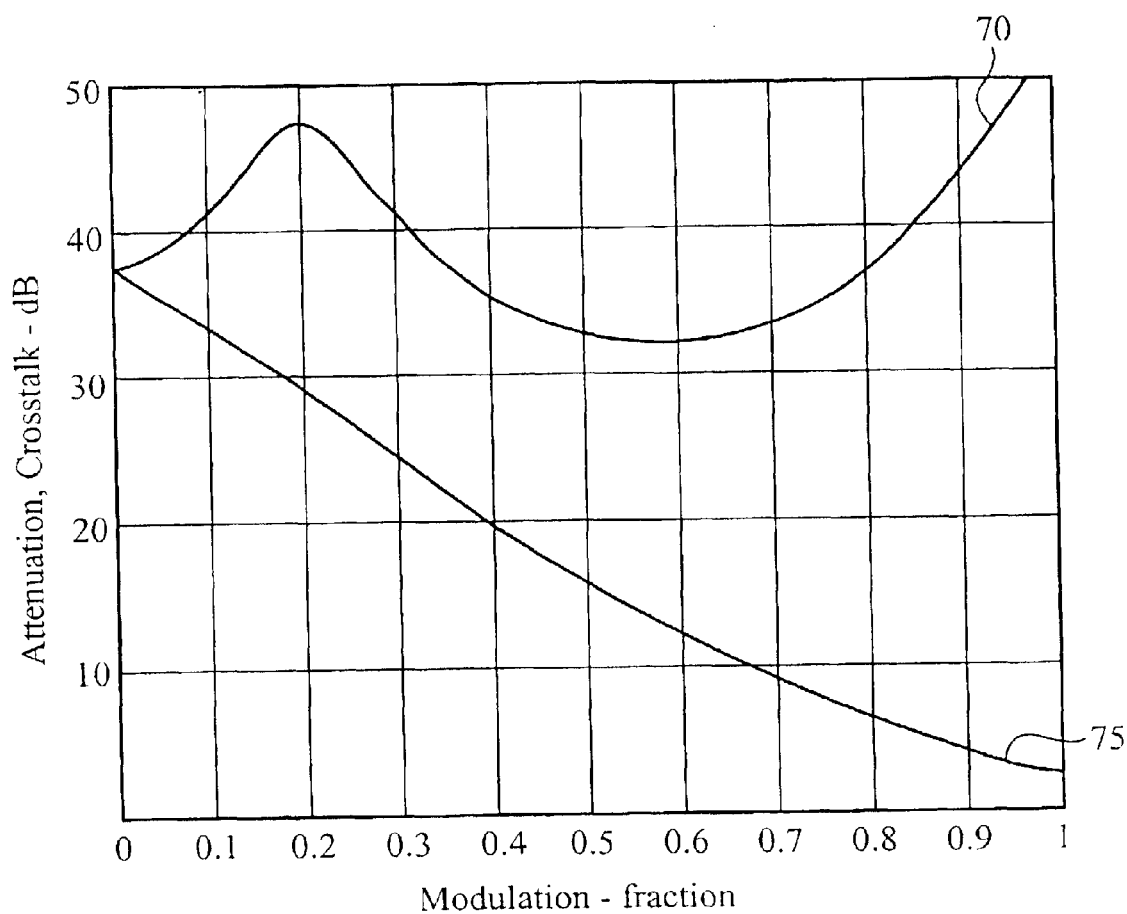
FIG. 9 is an exemplary attenuation and crosstalk graph for a positive tilt-stepped blaze grating.

FIG. 9 is an exemplary attenuation and crosstalk graph for a positive tilt stepped blaze grating. A crosstalk curve 70 shows that good crosstalk is maintained for all configurations of the elongated elements between and including the flat mirror configuration and the maximum diffraction configuration. An attenuation curve 75 illustrates the attenuation of the first order light. The crosstalk curve 70 and the attenuation curve 75 can be applied equally to the plus or minus first orders of light.

Figure 10:
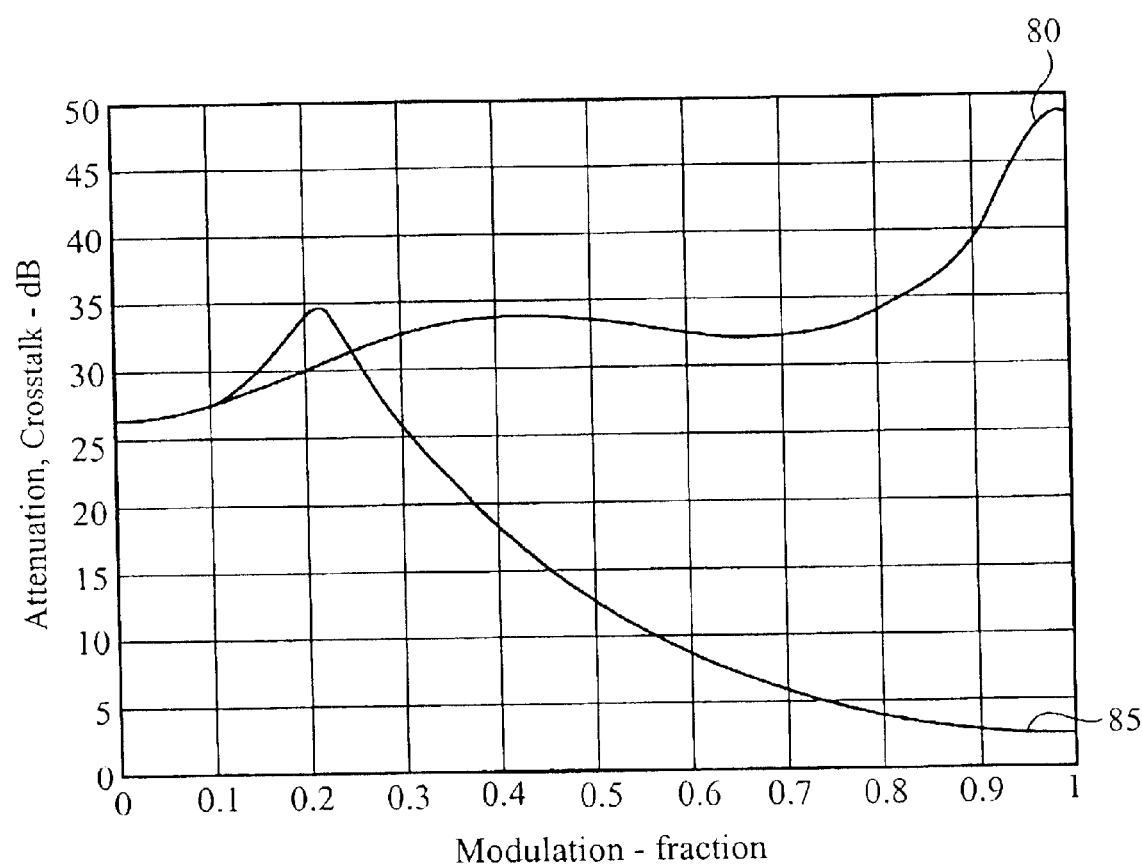
FIG. 10 is an exemplary attenuation and crosstalk graph for a negative tilt stepped blaze grating.

FIG. 10 is an exemplary attenuation and crosstalk graph for a negative tilt stepped blaze grating. A crosstalk curve 80 shows that good crosstalk is maintained for all configurations of the elongated elements between and including the flat mirror configuration and the maximum diffraction configuration. An attenuation curve 85 illustrates the attenuation of the first order light. The crosstalk curve 80 and the attenuation curve 85 can be applied equally to the plus or minus first orders of light. In this exemplary case, normal operation is preferably for 40% or more modulation, e.g. the right half of the curve in FIG. 10.

It is understood that additional output ports can be created by varying the height difference δ within any or all of the third, fourth, fifth, and sixth blaze diffraction modes. The height difference δ is limited by a sacrificial depth, which is the distance between the elongated elements 12 in an un-deflected state and the substrate 20. The number of useable output ports is determined by the number of collectable maximas of diffracted light with sufficiently low crosstalk.

Figure 11A:
FIG. 11A illustrates a cross-section of a diffractive light modulator in a reflection mode according to an alternative embodiment of the present invention.
Figure 11B:
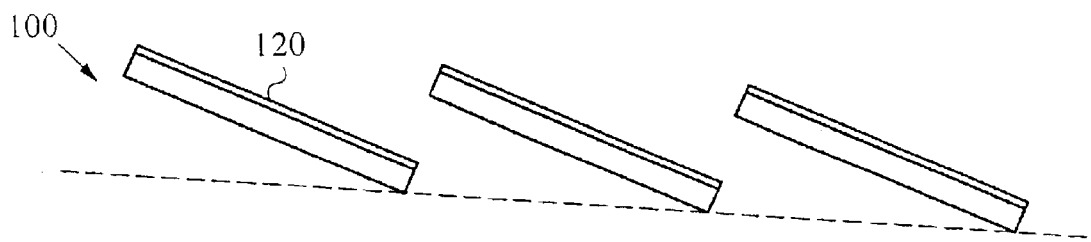
FIG. 11B illustrates a cross-section of the alternative diffractive light modulator in a seventh blaze diffraction mode.
Figure 11C:
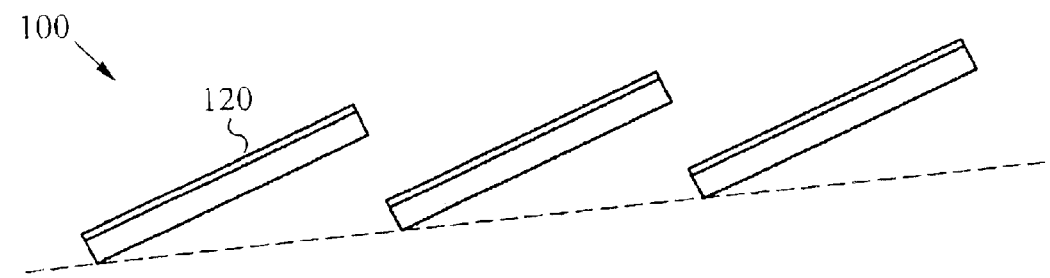
FIG. 11C illustrates a cross-section of the alternative diffractive light modulator in an eighth blaze diffraction mode.

In an alternative embodiment of the present invention, the elongated elements within a blaze element are replaced by a single elongated element such that a blaze element comprises a single elongated element. In this alternative embodiment, each elongated element is tilted, to form a blaze grating, and successive elongated elements are pulled down similarly to each of the blaze elements in either FIG. 6A or 6B. FIGS. 11A–11C illustrate various modes of this alternative embodiment. In this alternative embodiment, each channel preferably impinges 3 elongated elements. FIG. 11A illustrates a diffractive light modulator 100 comprising elongated elements 12 in a reflective mode. FIG. 11B illustrates the diffractive light modulator 100 in a seventh blaze diffraction mode in which the elongated elements 120 step down from left to right. FIG. 11C illustrates the diffractive light modulator 100 in an eighth blaze diffraction mode in which the elongated elements 120 step down from right to left.

It will be readily apparent to one skilled in the art that other various modifications may be made to the preferred embodiment without departing from the spirit and scope of the invention as defined by the appended claims. In particular, even though the present invention has been described above in relation to an incident light normal to the light modulator substrate, the present invention also includes embodiments in which the incident light is at an angle to the normal of the light modulator substrate.

I claim:

1. A light modulator comprising:
    a) a plurality of elongated elements, wherein each elongated element includes a light reflective planar surface with the light reflective planar surfaces configured in a first grating plane; and
    b) a support structure coupled to the elongated elements to maintain a position of the elongated elements relative to each other and to enable movement of each elongated element between a first modulator configuration wherein the elongated elements act to reflect incident light, and a second modulator configuration wherein the elongated elements are configured into a plurality of stepped blaze elements such that each blaze element comprises a plurality of adjacent stepped elongated elements, and each of the blaze elements are stepped relative to the other blaze elements along a second grating plane lying at a tilted grating angle to the first grating plane and act to diffract the incident light into at least two diffraction orders.

2. The light modulator according to claim 1 wherein a diffraction angle of each diffraction order is dependent on the grating angle.

3. The light modulator according to claim 1 wherein the stepped blaze elements configuration includes a plurality of stepped blaze elements, further wherein each blaze element includes a plurality of adjacent stepped elongated elements configured as a stepped blaze grating.

4. The light modulator according to claim 3 wherein each blaze element is separated by a blaze element height difference from an adjacent blaze element.

5. The light modulator according to claim 4 wherein the grating angle is about an arctangent of the blaze element height difference divided by a blaze element pitch.

6. The light modulator according to claim 5 wherein the incident light impinges the elongated elements normal to the first grating plane such that the at least two diffraction orders comprise a first positive diffraction order at a first plus order blaze angle of about an arcsine of a difference of a wavelength of the incident light divided by the blaze element pitch and a sine of the grating angle, and a first negative diffraction order at a first negative order blaze angle of about an arcsine of a difference of a negative of the wavelength of the incident light divided by the blaze element pitch and the sine of the grating angle.

7. The light modulator according to claim 6 wherein the at least two diffraction orders further comprise a near zero order diffraction order at a near zero order blaze angle of about two times the grating angle.

8. The light modulator according to claim 5 wherein the blaze element pitch comprises a sum of a width of each elongated element within the blaze element.

9. The light modulator according to claim 3 wherein each elongated element within the blaze element is separated by a constant height difference.

10. The light modulator according to claim 3 wherein the stepped elongated elements within each blaze element form a positive slope and the stepped blaze elements form a positive slope.

11. The light modulator according to claim 3 wherein the stepped elongated elements within each blaze element form a negative slope and the stepped blaze elements form a negative slope.

12. The light modulator according to claim 3 wherein the stepped elongated elements within each blaze element form a positive slope and the stepped blaze elements form a negative slope.

13. The light modulator according to claim 3 wherein the stepped elongated elements within each blaze element form a negative slope and the stepped blaze elements form a positive slope.

14. The light modulator according to claim 1 wherein the light modulator comprises a diffractive light modulator.

15. The light modulator according to claim 1 wherein the stepped blaze elements include each of the plurality of elongated elements commonly tilted and progressively stepped along the second grating plane.

16. The light modulator according to claim 1 wherein each elongated element further comprises a first conductive element and the light modulator further comprises a substrate coupled to the support structure, the substrate comprising a second conductive element such that in operation an electrical bias applied between the first conductive element and the second conductive element enables selective actuation of each of the elongated elements.

17. A method of modulating light comprising:
  a) supporting a plurality of elongated elements, each element includes a light reflective planar surface with the light reflective planar surfaces configured in a grating plane; and
  b) configuring the plurality of elongated elements between a first modulator configuration wherein the elongated elements act to reflect an incident light, and a second modulator configuration wherein the elongated elements are configured into a plurality of stepped blaze elements such that each blaze element comprises a plurality of adjacent stepped elongated elements, and each of the blaze elements are stepped relative to the other blaze elements along a second grating plane lying at a tilted grating angle to the first grating plane and act to diffract the incident light into at least two diffraction orders.

18. The method according to claim 17 wherein the incident light impinges the elongated elements normal to the first grating plane such that the at least two diffraction orders comprise a first positive diffraction order at a first plus order blaze angle of about an arcsine of a difference of a wavelength of the incident light divided by the blaze element pitch and a sine of the grating angle, the grating angle is then subtracted from the arcsine result, and a first negative diffraction order at a first negative order blaze angle of about an arcsine of a difference of a negative of the wavelength of the incident light divided by the blaze element pitch and the sine of the grating angle, the grating angle is then subtracted from the arcsine result.

19. The method according to claim 18 wherein the at least two diffraction orders further comprise a near zero order diffraction order at a near zero order blaze angle of about two times the grating angle.

20. A light modulator comprising:
  a) means for supporting a plurality of elongated elements, each element includes a light reflective planar surface with the light reflective planar surfaces configured in a grating plane; and
  b) means for configuring the plurality of elongated elements between a first modulator configuration wherein the elongated elements act to reflect an incident light, and a second modulator configuration wherein the elongated elements are configured into a plurality of stepped blaze elements such that each blaze element comprises a plurality of adjacent stepped elongated elements, and each of the blaze elements are stepped relative to the other blaze elements along a second grating plane lying at a tilted grating angle to the first grating plane and act to diffract the incident light into at least two diffraction orders.

* * * * *